(12) United States Patent
Liu et al.

(10) Patent No.: US 11,576,158 B2
(45) Date of Patent: Feb. 7, 2023

(54) DATA TRANSMISSION METHOD, TERMINAL DEVICE, AND NETWORK DEVICE

(71) Applicant: Huawei Technologies Co., Ltd., Shenzhen (CN)

(72) Inventors: Zhe Liu, Shanghai (CN); Guohua Zhou, Shanghai (CN); Yubo Yang, Shanghai (CN); Yi Long, Beijing (CN); Zhang Zhang, Shanghai (CN); Jinlin Peng, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 16/833,019

(22) Filed: Mar. 27, 2020

(65) Prior Publication Data
US 2020/0229180 A1 Jul. 16, 2020

Related U.S. Application Data

(63) Continuation of application No. PCT/CN2018/076753, filed on Feb. 13, 2018.

(30) Foreign Application Priority Data

Sep. 29, 2017 (WO) ................ PCT/CN2017/104667

(51) Int. Cl.
*H04W 72/04* (2009.01)
*H04W 76/19* (2018.01)
(Continued)

(52) U.S. Cl.
CPC ....... *H04W 72/0413* (2013.01); *H04L 5/0053* (2013.01); *H04W 72/042* (2013.01);
(Continued)

(58) Field of Classification Search
CPC ..... H04L 5/0048; H04L 5/001; H04L 5/0098; H04B 7/0695; H04W 76/15; H04W 76/19
See application file for complete search history.

(56) References Cited

U.S. PATENT DOCUMENTS

2016/0337785 A1  11/2016  Zhu et al.
2018/0124687 A1*  5/2018  Park ..................... H04L 5/1469
(Continued)

FOREIGN PATENT DOCUMENTS

CN      103703839 A     4/2014
CN      106341900 A     1/2017
(Continued)

OTHER PUBLICATIONS

USPTO, U.S. Appl. No. 62/564,897, USPTO (Year: 2017).*
(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

This application provides a data transmission method and a communications apparatus. The method includes: receiving uplink resource configuration information including information about at least two uplink reference points, and one uplink reference point corresponds to one uplink carrier; and determining, based on the uplink resource configuration information, an uplink carrier on which an uplink transmission resource is located.

20 Claims, 11 Drawing Sheets

(51) Int. Cl.
*H04W 76/27* (2018.01)
*H04L 5/00* (2006.01)
*H04W 72/0453* (2023.01)

(52) U.S. Cl.
CPC ....... *H04W 72/0453* (2013.01); *H04W 76/19* (2018.02); *H04W 76/27* (2018.02)

(56) References Cited

U.S. PATENT DOCUMENTS

| | | | |
|---|---|---|---|
| 2021/0075581 A1* | 3/2021 | Takeda | H04W 72/042 |
| 2021/0076445 A1* | 3/2021 | Tsai | H04W 76/19 |
| 2021/0266896 A1* | 8/2021 | Choi | H04L 5/0098 |

FOREIGN PATENT DOCUMENTS

| | | |
|---|---|---|
| CN | 107113787 A | 8/2017 |
| EP | 2664185 B1 | 6/2015 |
| EP | 3188563 A1 | 7/2017 |
| WO | 2013046025 A2 | 4/2013 |

OTHER PUBLICATIONS

USPTO, U.S. Appl. No. 62/587,248, USPTO (Year: 2017).*
Huawei et al., "Single UL transmission in NSA and SA NR", 3GPP TSG-RAN WG2 Meeting #99, R2-1709609, Berlin, Germany, Aug. 21-25, 2017, 4 pages.
Huawei et al., "Discussion on UL sub-carrier alignment," 3GPP TSG-RAN WG4 Meeting #84, R4-1707986, Berlin, Germany, Aug. 21-25, 2017, 4 pages.
CMCC, "Considerations on support of supplementary uplink frequency," 3GPP TSG-RAN WG2 Meeting #99, R2-1709093, Berlin, Germany, Aug. 21-25, 201, 4 pages.
Nokia, et al., "Correction to Served Cell Information for NB-IoT," 3GPP TSG-RAN Meeting #93bis, R3-162502, Sophia Antipolis, France, Oct. 10-14, 2016, 12 pages.
Samsung, "Removing SCG change restrictions regarding upon handover", 3GPP TSG-RAN2 Meeting #92, R2-157064, Anaheim, CA, USA, Nov. 16-20, 2015, 6 pages.

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/076753, filed on Feb. 13, 2018, which claims priority to International Application No. PCT/CN2017/104667, filed on Sep. 29, 2017. The disclosures of the aforementioned applications are hereby incorporated by reference in their entireties.

TECHNICAL FIELD

This application relates to the communications field, and more specifically, to a data transmission technology.

BACKGROUND

In new radio (NR) standardization of the 5th generation (5G) mobile communication, NR supports a frequency band from 6 GHz to 60 GHz, and a long term evolution (LTE) system is mainly deployed in a 3 GHz frequency band. When LTE is lightly loaded, in particular, when a long term evolution frequency division duplexing (LTE FDD) uplink resource is lightly loaded, spectrum resource utilization is relatively low. To make full use of uplink resources of an LTE FDD carrier, NR uplink transmission and LTE uplink transmission may share an uplink resource of the LTE FDD carrier, so that uplink spectrum resources of the LTE FDD carrier are made full use of and NR uplink coverage may also be improved. At a standardization meeting, it is determined that the shared uplink resource of the LTE FDD carrier may be considered as a supplementary uplink frequency resource (SUL) of NR. For a supplementary uplink resource, NR user equipment (UE) may access an NR network by selecting an appropriate physical random access channel (PRACH) from NR FDD/time division duplexing (TDD) uplink resources and supplementary uplink resources. The way of using an SUL resource needs further study.

SUMMARY

This application provides a data transmission method, a terminal device, and a network device. When there are a plurality of available uplink carriers in a cell of the terminal device, the network device sends information about reference points of the plurality of uplink carriers to the terminal device, and the terminal device may determine a carrier, in the plurality of uplink carriers, on which an uplink transmission resource used by the terminal device is located. In this way, the terminal device is saved from misunderstanding and conflicts during use of uplink resources on the plurality of uplink carriers, and transmission efficiency and quality are improved.

According to a first aspect, a data transmission method is provided. The method includes: receiving, by a terminal device, uplink resource configuration information sent by a network device, where the uplink resource configuration information includes information about at least two uplink reference points, and one uplink reference point corresponds to one uplink carrier; and determining, by the terminal device based on the uplink resource configuration information, an uplink carrier on which an uplink transmission resource is located.

According to the data transmission method provided in the first aspect, when there are a plurality of uplink carriers in a cell accessed by the terminal device, the network device sends information about reference points of the plurality of uplink carriers to the terminal device, and the terminal device may determine a carrier, in the plurality of uplink carriers, on which the uplink transmission resource used by the terminal device is located, so that the terminal device may complete initial access or subsequent data transmission on the corresponding resource of the uplink carrier. In this way, the terminal device is saved from misunderstanding and conflicts during use of uplink resources on the plurality of uplink carriers, and transmission efficiency and quality are improved.

In a possible implementation of the first aspect, the receiving, by a terminal device, uplink resource configuration information sent by a network device includes: receiving, by the terminal device, a system information block SIB sent by the network device, where the SIB includes the uplink resource configuration information, the uplink resource configuration information further includes information about at least two uplink initial bandwidth parts BWPs, and one uplink initial BWP corresponds to one uplink reference point; and the determining, by the terminal device based on the uplink resource configuration information, an uplink carrier on which an uplink transmission resource is located includes: determining, by the terminal device based on the SIB, an uplink initial BWP of the uplink carrier used for initial access.

In a possible implementation of the first aspect, the method further includes: receiving, by the terminal device, radio resource control RRC connection establishment information or RRC connection re-establishment information or RRC connection reconfiguration information sent by the network device, where the RRC connection establishment information or the RRC connection re-establishment information or the RRC connection reconfiguration information includes the information about at least one of the uplink reference points; and determining, by the terminal device based on the RRC connection establishment information or the RRC connection re-establishment information or the RRC connection reconfiguration information, an uplink carrier resource used for uplink transmission.

In a possible implementation of the first aspect, the RRC connection reconfiguration information further includes target cell configuration information, where the target cell configuration information includes the uplink resource configuration information, and the method further includes: performing, by the terminal device, target cell handover based on the target cell configuration information.

In a possible implementation of the first aspect, the RRC connection reconfiguration information further includes information about an uplink reference point, information about a downlink reference point, a physical cell ID, a synchronization signal block, and offset information of the downlink reference point that are of a secondary cell carrier pair of the terminal device; and the method further includes: adding, by the terminal device, the secondary cell carrier pair based on the RRC connection reconfiguration information.

In a possible implementation of the first aspect, the RRC connection reconfiguration information further includes at least one of a physical cell identifier ID of a synchronization signal block SSB associated with a secondary cell carrier of the terminal device, frequency domain information of the SSB associated with the secondary cell carrier of the terminal device, and information about a downlink reference point of the secondary cell carrier of the terminal device, and the method further includes: adding, by the terminal device, the secondary cell carrier based on the RRC connection reconfiguration information.

In a possible implementation of the first aspect, the RRC connection establishment information or the RRC connection re-establishment information or the RRC connection reconfiguration information further includes at least one of uplink BWP configuration information of the terminal device, physical uplink control channel PUCCH configuration information, and sounding reference signal SRS information of the terminal device.

In a possible implementation of the first aspect, the information about the uplink reference point includes at least one of an absolute frequency domain position corresponding to the uplink reference point and a reference point index value corresponding to the uplink reference point.

According to a second aspect, a data transmission method is provided. The method includes: receiving, by a terminal device, radio resource control RRC connection reconfiguration information sent by a network device, where the RRC connection reconfiguration information includes at least one of a physical cell identifier ID of a synchronization signal block SSB associated with a secondary cell of the terminal device, frequency domain information of the SSB associated with the secondary cell of the terminal device, and information about a downlink reference point of the secondary cell of the terminal device; and adding, by the terminal device, the secondary cell based on the RRC connection reconfiguration information.

According to the data transmission method provided in the second aspect, when the terminal device needs to add the secondary cell, the network device may notify the terminal device of related information of the secondary cell. In this way, the terminal device may quickly and accurately access the secondary cell, thereby reducing a quantity of times of blind detection performed by the terminal device, and improving communication efficiency and user experience.

In a possible implementation of the second aspect, the frequency domain information of the SSB associated with the secondary cell of the terminal device includes at least one of a frequency domain position reference value of the SSB associated with the secondary cell carrier of the terminal device, the SSB associated with the secondary cell of the terminal device, offset information of the downlink reference point of the secondary cell of the terminal device, and a number of a frequency band on which the SSB associated with the secondary cell of the terminal device is located.

In a possible implementation of the second aspect, the SSB associated with the secondary cell of the terminal device is an SSB of the secondary cell of the terminal device.

In a possible implementation of the second aspect, the RRC connection reconfiguration information further includes information about an uplink reference point, information about a downlink reference point, a physical cell ID, a synchronization signal block, and offset information of the downlink reference point that are of a secondary cell carrier pair of the terminal device, and the method further includes: adding, by the terminal device, the secondary cell carrier pair based on the RRC connection reconfiguration information.

According to a third aspect, a data transmission method is provided. The method includes: generating, by a network device, uplink resource configuration information, where the uplink resource configuration information includes information about at least two uplink reference points, and one uplink reference point corresponds to one uplink carrier; and sending, by the network device, the uplink resource configuration information to a terminal device, where the uplink resource configuration information is used by the terminal device to determine an uplink carrier on which an uplink transmission resource is located.

According to the data transmission method provided in the third aspect, when there are a plurality of uplink carriers in a cell accessed by the terminal device, the network device sends information about reference points of the plurality of uplink carriers to the terminal device, and the terminal device may determine, based on the information about the plurality of reference points, a carrier, in the plurality of uplink carriers, on which the uplink transmission resource used by the terminal device is located, so that the terminal device may complete initial access or subsequent data transmission on the corresponding resource of the uplink carrier. In this way, the terminal device is saved from misunderstanding and conflicts during use of uplink resources on the plurality of uplink carriers, and transmission efficiency and quality are improved.

In a possible implementation of the third aspect, the generating, by a network device, uplink resource configuration information includes: generating, by the network device, a system information block SIB, where the SIB includes the uplink resource configuration information, the uplink resource configuration information further includes information about at least two uplink initial bandwidth parts BWPs, and one uplink initial BWP corresponds to one uplink reference point; and the sending, by the network device, the uplink resource configuration information to the terminal device includes: sending, by the network device, the SIB to the terminal device.

In a possible implementation of the third aspect, the RRC connection reconfiguration information further includes target cell configuration information, where the target cell configuration information includes information about an uplink reference point, information about a downlink reference point, a physical cell ID, a synchronization signal block, and offset information of the downlink reference point of the carrier pair, and the target cell configuration information is used by the terminal device to perform target cell handover.

In a possible implementation of the third aspect, the RRC connection reconfiguration information further includes information about an uplink reference point, information about a downlink reference point, a physical cell ID, a synchronization signal block, and offset information of the downlink reference point that are of a secondary cell carrier pair of the terminal device, and the RRC connection reconfiguration information is used by the terminal device to add the secondary cell carrier pair.

In a possible implementation of the third aspect, the RRC connection reconfiguration information further includes at least one of a physical cell identifier ID of a synchronization signal block SSB associated with a secondary cell carrier of the terminal device, frequency domain information of the SSB associated with the secondary cell carrier of the terminal device, and information about a downlink reference point of the secondary cell carrier of the terminal device, and the RRC connection reconfiguration information is used by the terminal device to add the secondary cell carrier.

In a possible implementation of the third aspect, the RRC connection establishment information or the RRC connection re-establishment information or the RRC connection reconfiguration information further includes at least one of uplink BWP configuration information of the terminal device, physical uplink control channel PUCCH configuration information, and sounding reference signal SRS information of the terminal device.

In a possible implementation of the third aspect, the information about the uplink reference point includes an absolute frequency domain position corresponding to the uplink reference point.

According to a fourth aspect, a data transmission method is provided. The method includes: generating, by a network device, radio resource control RRC connection reconfiguration information, where the RRC connection reconfiguration information includes at least one of a physical cell identifier ID of a synchronization signal block SSB associated with a secondary cell of a terminal device, frequency domain information of the SSB associated with the secondary cell of the terminal device, and information about a downlink reference point of the secondary cell of the terminal device; and sending, by the network device, the RRC connection reconfiguration information to the terminal device, where the RRC connection reconfiguration information is used by the terminal device to add the secondary cell.

According to the data transmission method provided in the fourth aspect, the network device may notify the terminal device of the RRC connection reconfiguration information, and the RRC connection reconfiguration information includes at least one of the physical cell identifier ID of the synchronization signal block SSB associated with the secondary cell of the terminal device, the frequency domain information of the SSB associated with the secondary cell of the terminal device, and the information about the downlink reference point of the secondary cell of the terminal device. In this way, the terminal device may quickly and accurately access the secondary cell, thereby reducing a quantity of times of blind detection performed by the terminal device, and improving communication efficiency and user experience.

In a possible implementation of the fourth aspect, the frequency domain information of the SSB associated with the secondary cell of the terminal device includes at least one of a frequency domain position reference value of the SSB associated with the secondary cell carrier of the terminal device, the SSB associated with the secondary cell of the terminal device, offset information of the downlink reference point of the secondary cell of the terminal device, and a number of a frequency band on which the SSB associated with the secondary cell of the terminal device is located.

In a possible implementation of the fourth aspect, the SSB associated with the secondary cell of the terminal device is an SSB of the secondary cell carrier of the terminal device.

In a possible implementation of the fourth aspect, the RRC connection reconfiguration information further includes information about an uplink reference point, information about a downlink reference point, a physical cell ID, a synchronization signal block, and offset information of the downlink reference point that are of a secondary cell carrier pair of the terminal device, and the RRC connection reconfiguration information is used by the terminal device to add the secondary cell carrier pair.

According to a fifth aspect, a terminal device is provided. The terminal device includes a processor, a memory, and a transceiver that are configured to support the terminal device in performing a corresponding function in the foregoing methods. The processor, the memory, and the transceiver are connected through communication, the memory stores an instruction, the transceiver is configured to perform specific signal sending and receiving under driving of the processor, and the processor is configured to invoke the instruction to implement the data transmission method according to the first aspect and the second aspect, or various implementations of the first aspect and the second aspect.

According to a sixth aspect, a terminal device is provided. The terminal device includes a processing module, a storage module, and a transceiver module that are configured to support the terminal device in performing a function of the terminal device in any one of the first aspect and the second aspect, or the possible implementations of the first aspect and the second aspect. The function may be implemented by hardware, or may be implemented by hardware executing corresponding software. The hardware or the software includes one or more modules corresponding to the foregoing function.

According to a seventh aspect, a network device is provided. The network device includes a processor, a memory, and a transceiver that are configured to support the network device in performing a corresponding function in the foregoing methods. The processor, the memory, and the transceiver are connected through communication, the memory stores an instruction, the transceiver is configured to perform specific signal sending and receiving under driving of the processor, and the processor is configured to invoke the instruction to implement the data transmission method according to the third aspect and the fourth aspect or various implementations of the third aspect and the fourth aspect.

According to an eighth aspect, a network device is provided. The network device includes a processing module, a storage module, and a transceiver module that are configured to support the network device in performing a function of the network device in any one of the third aspect and the fourth aspect, or the possible implementations of the third aspect and the fourth aspect. The function may be implemented by hardware, or may be implemented by hardware executing corresponding software. The hardware or the software includes one or more modules corresponding to the foregoing function.

According to a ninth aspect, a communications system is provided. The communications system includes the terminal device provided in the fifth aspect or the sixth aspect and the network device provided in the seventh aspect or the eighth aspect. The communications system may complete the data transmission method according to any one of the first aspect to the fourth aspect or the possible implementations of the first aspect to the fourth aspect.

According a tenth aspect, a communications apparatus is provided. The communications apparatus includes a processor (a processing circuit), configured to: be coupled to a memory, and read and execute an instruction in the memory, to implement the method according to any one of the foregoing aspects. Optionally, the communications apparatus further includes the memory. Optionally, the communications apparatus may be a chip, a chip system, an integrated circuit, or the like. Optionally, the communications apparatus may be integrated into a terminal device or a network device.

According to an eleventh aspect, a computer-readable storage medium is provided. The computer-readable storage medium is configured to store a computer program, and the computer program includes an instruction used to perform the method according to any one of the first aspect to the fourth aspect or the possible implementations of the first aspect to the fourth aspect.

According to a twelfth aspect, a system chip is provided. The system chip includes a processing unit and a communications unit. The processing unit can execute a computer instruction, to enable a chip in the terminal to perform the method according to any one of the first aspect to the fourth aspect or the possible implementations of the first aspect to the fourth aspect.

According to a thirteenth aspect, a computer program product is provided. The product includes an instruction used to perform the method according to any one of the first aspect to the fourth aspect or the possible implementations of the first aspect to the fourth aspect.

DETAILED DESCRIPTION OF ILLUSTRATIVE EMBODIMENTS

Figure 1:
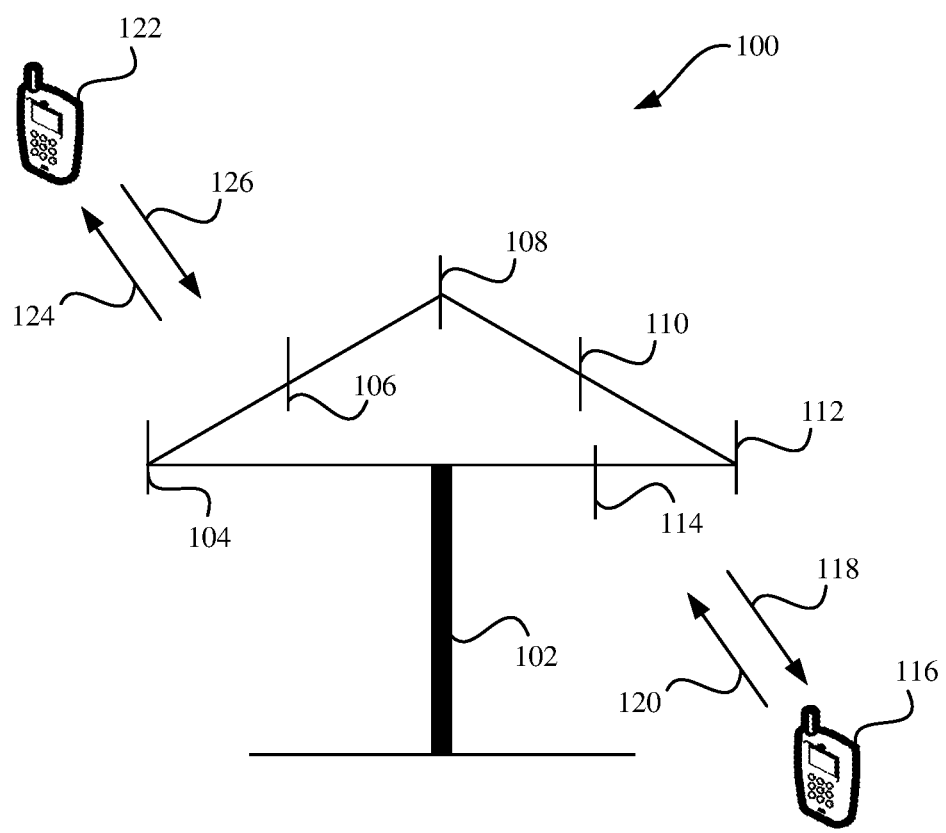
FIG. 1 is a schematic diagram of a communications system to which a data transmission method of the present invention is applicable.

The following describes technical solutions of this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device for communicating with the terminal device. The network device may be a base transceiver station (BTS) in the global system for mobile communications (GSM) or code division multiple access (CDMA), or may be a NodeB (NB) in a wideband code division multiple access (WCDMA) system, or may be an evolved NodeB (Evolutional NodeB, eNB or eNodeB) in an LTE system, or may be a radio controller in a cloud radio access network (CRAN) scenario, or may be a relay station, an access point, a vehicle-mounted device, a wearable device, a network device in the future 5G network, a network device in the future evolved PLMN network, or the like. This is not limited in the embodiments of this application.

In 5G NR standardization, NR supports a frequency band from 6 GHz to 60 GHz, and a long term evolution (LTE) is mainly deployed in a 3 GHz frequency band. When LTE is lightly loaded, in particular, when an LTE frequency division duplexing (Long Term Evolution Frequency Division Duplexing, LTE FDD) uplink resource is lightly loaded, spectrum resource utilization is relatively low. To make full use of uplink resources of an LTE FDD carrier, NR uplink transmission and LTE uplink transmission may share an uplink resource of the LTE FDD carrier, so that uplink spectrum resources of the LTE FDD carrier are made full use of and NR uplink coverage may also be improved. At a standardization meeting, it is determined that the shared uplink resource of the LTE FDD carrier may be considered as a supplementary uplink frequency resource (SUL) of NR. For the supplementary uplink resource, NR user equipment (UE) may access an NR network by selecting an appropriate physical random access channel (PRACH) from NR FDD/time division duplexing (TDD) uplink resources and supplementary uplink resources.

For example, for an SUL carrier or frequency resource, SUL means that only an uplink resource is used for transmission in a current communication standard. For example, for a carrier, only an uplink resource is used for transmission. For example, in an NR communications system, a carrier A is used for only uplink transmission of NR, and the carrier is not used for downlink transmission. For example, if the carrier A is not used for downlink transmission in an LTE communications system and is not used for downlink transmission in NR, the carrier A is an SUL resource.

The foregoing uplink resource may be understood as a part of a carrier (including a carrier in a non-carrier aggregation (CA) scenario and a component carrier (CC) in a CA scenario) that is used for uplink transmission or a part of a serving cell (including a serving cell in the CA scenario and a serving cell in the non-CA scenario) that is used for uplink transmission. The CC in the CA scenario may be a primary CC or a secondary CC, and the serving cell in the CA scenario may be a primary cell (PCell) or a secondary cell (SCell). The uplink resource may also be referred to as an uplink carrier. Correspondingly, a part of the carrier or the serving cell that is used for downlink transmission may be understood as a downlink resource or a downlink carrier. For example, in an FDD system, a frequency resource for uplink transmission on a carrier may be understood as the uplink resource or the uplink carrier, and a frequency resource for downlink transmission may be understood as the downlink resource or the downlink carrier. For another example, in a TDD system, a time domain resource for uplink transmission on a carrier may be understood as the uplink resource or the uplink carrier, and a time domain resource for downlink transmission may be understood as the downlink resource or the downlink carrier.

In existing LTE, a carrier may be a pair of FDD carriers (an uplink carrier and a downlink carrier that are formed in an FDD manner in different frequency domains) or an unpaired TDD carrier (an uplink slot set and a downlink slot set on a carrier that are formed in a TDD manner in different time domains). A carrier broadcasts only uplink-related configuration information and downlink-related configuration information of the carrier in a system message, and notifies system bandwidth. The uplink-related configuration information and the downlink-related configuration information of the carrier includes only common configuration information of one downlink carrier and one uplink carrier. After UE camps on a cell and initiates initial access to establish a radio resource control (RRC) connection in the cell, information such as a UE-level physical uplink shared channel (PUSCH), a UE-level physical uplink control channel (PUCCH), a UE-level physical downlink shared channel (PDSCH), and a UE-level sounding reference signal (SRS) is configured in RRC signaling for the UE. When the UE needs to increase an uplink rate or a downlink rate, the cell adds a neighboring cell/carrier as a secondary cell (SCell) or a primary/secondary carrier (Primary/Secondary Cell, P/SCell) to the UE. In this case, uplink carrier configuration information and downlink carrier configuration information of the neighboring cell are notified to the UE by using RRC signaling of the primary cell.

In NR, a cell has carrier bandwidth/system bandwidth. In NR, a cell is viewed from a perspective of a UE side, and the UE has a bandwidth part (BWP), so that UE energy can be saved or different subcarrier spacing requirements of the UE can be met. Working bandwidth of the UE is decoupled from the system bandwidth. Therefore, when a base station allocates a BWP to the UE, a network side performs allocation based on information about a reference point of a system carrier and a common physical resource block (PRB) grid index of a subcarrier spacing. PRBs occupied by the BWP are allocated to the UE by using the reference point and the common physical resource block grid index, so that the UE does not need to know the system bandwidth. The reference point may be a common PRB index 0. For an NR TDD carrier, a reference point for allocating a BWP on an uplink carrier is usually the same as or different from a reference point for allocating a BWP on a downlink carrier. For an NR FDD carrier, a reference point for allocating a BWP on an uplink carrier is different from a reference point for allocating the BWP on a downlink carrier. However, there is only one reference point for BWP allocation on the uplink carrier.

In existing LTE, for UE, there is only one uplink carrier in one cell. Because one uplink carrier has only one uplink reference point, the uplink reference point does not change when the UE performs cell search for initial access to the cell or subsequent high-layer signaling interaction. After receiving a scheduling instruction sent by the network device, the UE may determine, based on information about the uplink reference point, information such as a BWP used on the uplink carrier during uplink transmission.

In NR, if an NR downlink carrier, an NR uplink carrier, and an NR SUL carrier are considered as an NR carrier (cell), the cell includes two uplink carriers. Because frequency ranges of the two uplink carriers differ greatly, and a maximum common PRB index value of an uplink reference point is 275, resource allocation on the NR UL carrier and the NR SUL carrier cannot be covered. Therefore, for the NR uplink carrier and the NR SUL carrier, there are two uplink reference points. When uplink BWP resource allocation (sending a PUSCH, a PUCCH, or an SRS)/initial uplink BWP resource allocation/random access channel (RACH) resource allocation is performed, if an uplink reference point, that is, an uplink carrier, on which the allocation is based is not further indicated, the UE may be prone to misunderstand use of the uplink resource, and the UE cannot determine a carrier on which the resource that is allocated to the UE is based. Resource conflicts may be caused, which affects user communication.

In NR, if an NR downlink carrier and an NR uplink carrier are considered as a cell, and an NR SUL and a downlink carrier are considered as another cell, there is currently no related technology about whether an NR supplementary uplink resource can be used as a part of an uplink carrier of a PCell, and how to use the NR supplementary uplink resource as a part of the uplink carrier of the PCell or an SCell.

Based on the foregoing problem, this application provides a data transmission method. When an NR downlink carrier, an NR uplink carrier, and an NR SUL are considered as an NR cell, or an NR downlink carrier and an NR uplink carrier are considered as a cell, and an NR SUL and a downlink carrier are considered as another cell, a problem about how to use the supplementary uplink carrier resource by the UE is resolved. In this way, it is ensured that the UE can improve efficiency and communication quality.

FIG. 1 is a schematic diagram of a communications system to which a data transmission method of the present invention is applicable. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, an encoder, a demultiplexer, or an antenna) related to signal sending and receiving.

The network device 102 may communicate with a plurality of terminal devices (for example, a terminal device 116 and a terminal device 122). It may be understood that the network device 102 may communicate with any quantity of terminal devices that are similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other proper device used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in an FDD system, the forward link 118 may use a frequency band different from that used by the reverse link 120, and the forward link 124 may use a frequency band different from that used by the reverse link 126.

For another example, in a TDD system and a full duplex system, the forward link 118 and the reverse link 120 may use a common frequency band, and the forward link 124 and the reverse link 126 may use a common frequency band.

Each antenna (or an antenna stack including a plurality of antennas) and/or area designed for communication is referred to as a sector of the network device 102. For example, the antenna stack may be designed to communicate with a terminal device in a sector within coverage of the network device 102. In a process in which the network device 102 communicates with the terminal devices 116 and 122 respectively on the forward links 118 and 124, a transmit antenna of the network device 102 may improve signal-to-noise ratios of the forward links 118 and 124 through beamforming. In addition, compared with a manner in which the network device sends a signal to all terminal devices of the network device by using a single antenna, when the network device 102 sends, through beamforming, a signal to the terminal devices 116 and 122 that are randomly scattered within related coverage, a mobile device in a neighboring cell suffers less interference.

At a given time, the network device 102, the terminal device 116, or the terminal device 122 may be a wireless communications transmitting apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, or another network. FIG. 1 is merely a simplified schematic diagram which is used as an example, and the network may further include another network device, which is not shown in FIG. 1.

Figure 2:
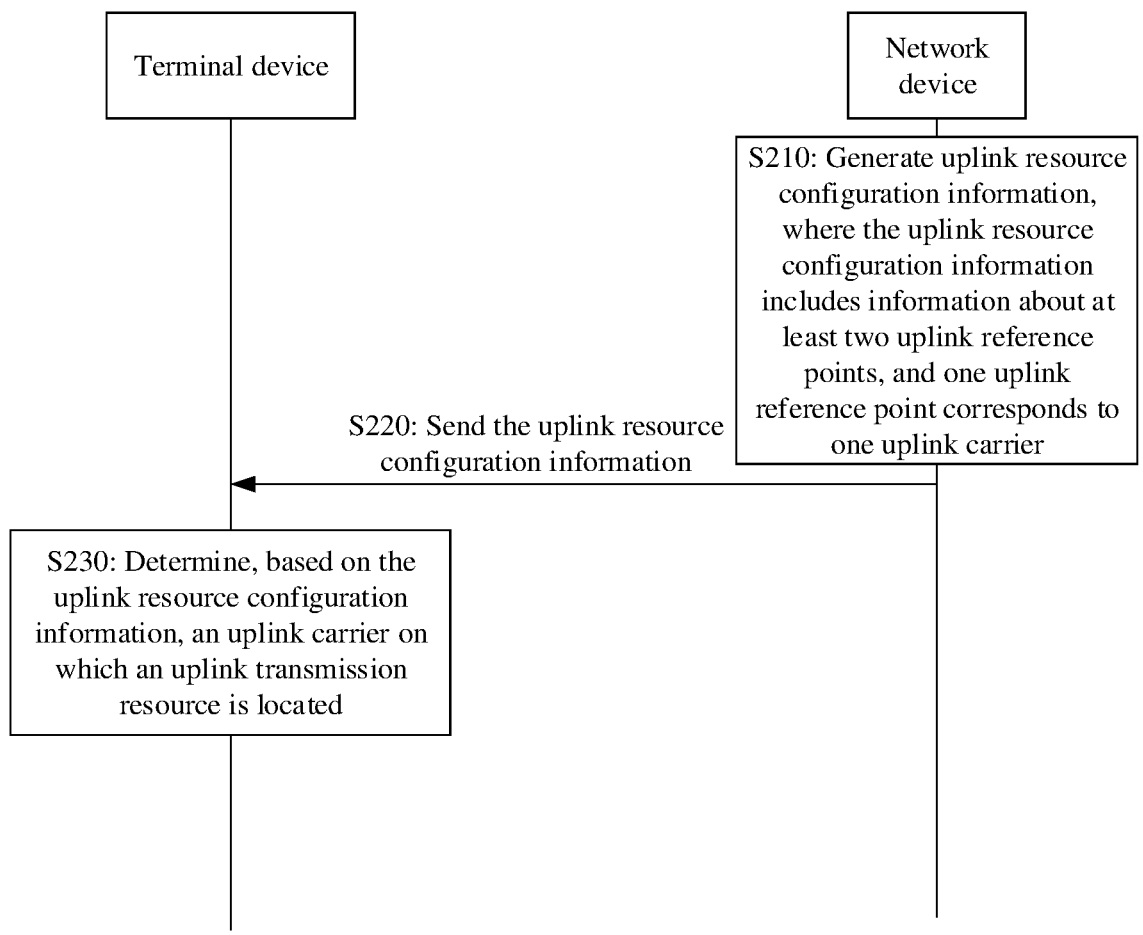
FIG. 2 is a schematic flowchart of a data transmission method according to an embodiment of this application.

The following describes in detail a data transmission method provided in this application with reference to FIG. 2. FIG. 2 is a schematic flowchart of a data transmission method 200 according to an embodiment of this application. The method 200 may be applied to the scenario shown in FIG. 1, and certainly may also be applied to another communications scenario. This is not limited in this embodiment of this application.

As shown in FIG. 2, the method 200 includes the following steps.

S210: A network device generates uplink resource configuration information, where the uplink resource configuration information includes information about at least two uplink reference points, and one uplink reference point corresponds to one uplink carrier.

S220: The network device sends the uplink resource configuration information to a terminal device, and correspondingly, the terminal device receives the uplink resource configuration information.

S230: The terminal device determines, based on the uplink resource configuration information, an uplink carrier on which an uplink transmission resource is located.

According to the data transmission method provided in this embodiment of this application, when there are a plurality of uplink carriers in a cell accessed by the terminal device, the network device sends information about reference points of the plurality of uplink carriers to the terminal device, and the terminal device may determine, based on the information about the plurality of reference points, a carrier, in the plurality of uplink carriers, on which the uplink transmission resource used by the terminal device is located, so that the terminal device may complete initial access or subsequent data transmission on the corresponding resource of the uplink carrier. In this way, the terminal device is saved from misunderstanding and conflicts during use of uplink resources on the plurality of uplink carriers, and transmission efficiency and quality are improved.

The following describes an example in which a cell accessed by the terminal device includes two uplink carriers. It should be understood that, a cell accessed by the terminal device may further include more uplink carriers. This is not limited in this embodiment of this application.

Figure 3:
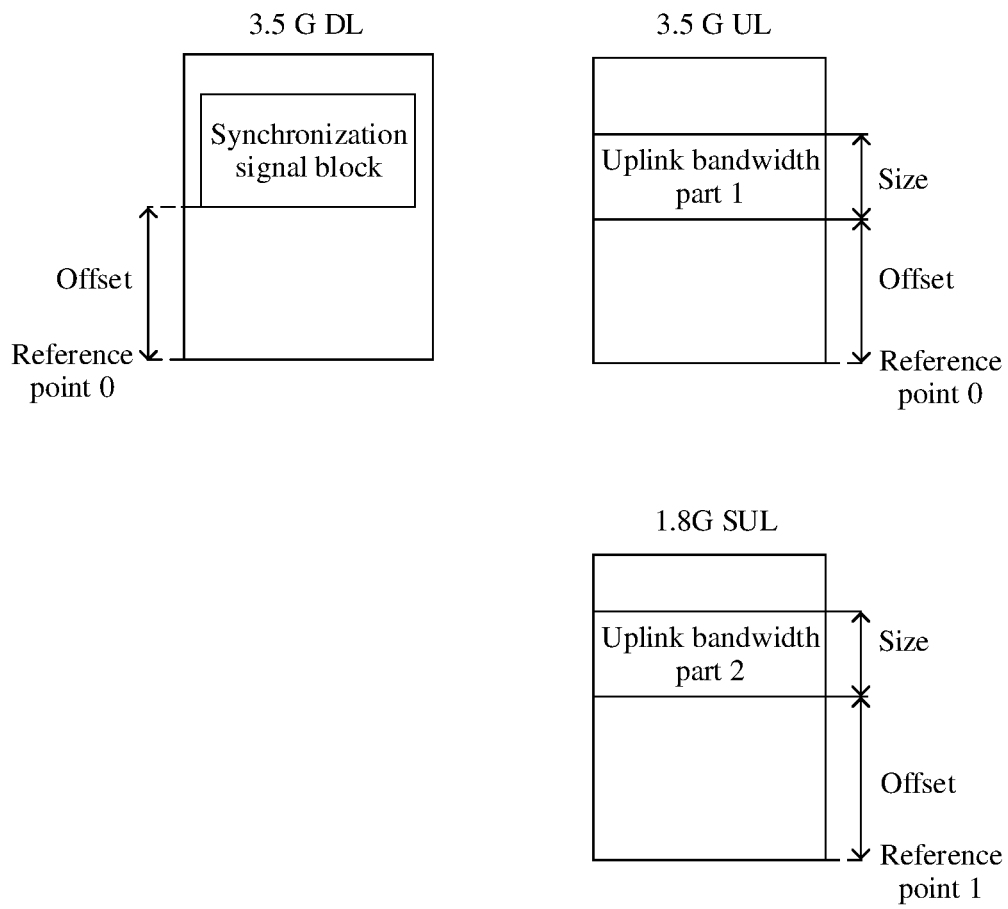
FIG. 3 is a schematic diagram of a cell of a terminal device according to an embodiment of this application.

FIG. 3 is a schematic diagram of a cell of a terminal device according to an embodiment of this application. As shown in FIG. 3, the cell includes an NR downlink (3.5 G DL) carrier, an NR UL (3.5 G UL) carrier, and an NR SUL (1.8 G UL) carrier. In this case, the cell includes a downlink carrier and two uplink carriers, in other words, there is a downlink reference point and two uplink reference points, namely, an NR uplink carrier reference point and an NR SUL carrier reference point. Information about the uplink reference points is used to determine an uplink carrier on which the terminal device performs access, and information about occupied bandwidth of the uplink carrier on which the access is performed, and the like. Therefore, information about an uplink reference point substantially corresponds to an uplink carrier, and based on the information about the uplink reference point and resource configuration information, an uplink carrier on which an uplink transmission resource allocated to the terminal device is located may be determined, and time-frequency resources of the uplink carrier on which the uplink transmission resource is located may be further determined. That is, the information about an uplink reference point corresponds to information such as uplink bandwidth occupied by the terminal device. The information about the reference point may be used to determine an uplink carrier accessed by UE and information about bandwidth on the uplink carrier. The UE may determine, based on information about each reference point and other information sent by the network device, for example, BWP information, a PUSCH, or a PUCCH corresponding to each reference point, a corresponding BWP accessed on a corresponding carrier, for example, a BWP 1 accessed on the 3.5 G UL carrier and a BWP 2 accessed on the 1.8 G UL carrier. In addition, the BWP accessed on the 3.5 G UL carrier and the BWP accessed on the 1.8 G UL carrier may be uniformly numbered. In addition, the information about the reference points of the two uplink carriers may be identified by using reference point indexes. For example, the information about the reference point of the 3.5 G UL carrier may be a reference point index 0, and the information about the reference point of the 1.8 G UL carrier may be a reference point index 1.

Optionally, in an embodiment, step S210 includes: generating, by the network device, a system information block (SIB), where the SIB includes the uplink resource configuration information. The uplink resource configuration information further includes information about at least two uplink initial bandwidth parts BWPs, and one uplink initial BWP corresponds to one uplink reference point. The SIB may be remaining minimum system information (RMSI). It should be understood that a type of the system message block is not limited in this embodiment of this application. Correspondingly, in S220, the network device sends the SIB to the terminal device. In S230, the terminal device receives the SIB, and determines, based on the SIB, an uplink initial BWP of the uplink carrier used for initial access.

Specifically, for example, when there are two uplink carriers in a cell, in a process in which the terminal device performs cell search and initial access, reference information of the two uplink carriers and corresponding bandwidth parts BWPs need to be known. One uplink initial BWP corresponds to one uplink reference point. Therefore, the uplink configuration information further includes the information about the at least two uplink initial bandwidth parts BWPs. The information is included in the SIB sent by the network device to the terminal device. The terminal device determines, based on the information about the reference points and the information about the uplink initial BWPs, an uplink initial BWP of the uplink carrier used for initial access. The uplink initial BWP may be used by the terminal device to send at least one of an acknowledgement/negative acknowledgement (ACK/NACK) for a message 3 (Msg 3) and a message 4 (Message 4, Msg 4) in an initial access process. An uplink initial BWP on a carrier may include a frequency domain resource for sending a message 1 (Msg 1) by the terminal device on the carrier in frequency domain, in other words, initial access to the cell is performed on a resource block on the uplink carrier, and an RRC connection is established. In addition, the uplink initial BWP may alternatively not include the frequency domain resource of the Msg 1 in frequency domain. This is not limited in this embodiment of this application.

Figure 4:
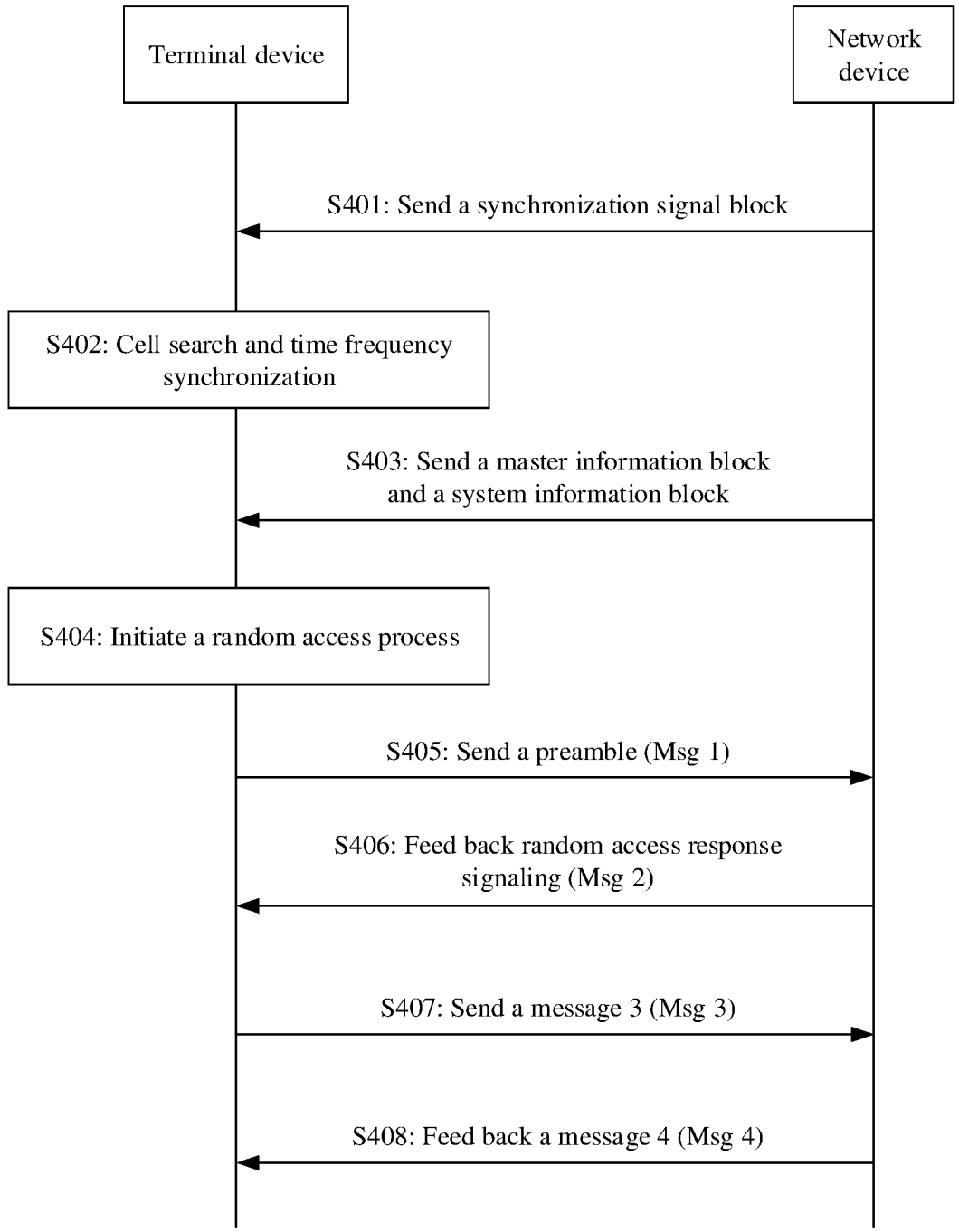
FIG. 4 is a schematic flowchart showing that a terminal device performs cell search and an initial access process according to an embodiment of this application.

Details are described below with reference to FIG. 4. FIG. 4 is a schematic flowchart showing that the terminal device (UE) performs cell search and an initial access process. As shown in FIG. 4, that the UE accesses the network device mainly includes the following steps.

S401: The network device periodically sends a synchronization signal block (SS Block), and the synchronization signal block includes a primary synchronization signal (PSS), a secondary synchronization signal (SSS), and a physical broadcast channel (PBCH).

S402: The UE performs cell search, and selects, based on the PSS or the SSS, a best cell to camp on. For ease of description, the "best cell" is represented as a first cell herein. In addition, the UE can maintain time and frequency synchronization with the first cell based on the PSS/SSS.

S403: The UE obtains a master information block (MIB) and an SIB that are sent by the first cell. A time domain resource of the MIB is predefined, and a frequency domain resource of the SIB is scheduled by using a downlink control channel.

S404: After obtaining the MIB and the SIB, the UE initiates a random access process to establish a connection to the first cell. When an access type is contention-based access, the access process includes steps S405, S406, S407, and S408. When the access type is contention-free access, the access process includes steps S405 and S406, and a cell search process includes only steps S401 and S402.

S405: The UE sends a preamble to the network device on a physical random access channel (PRACH), and a resource of the preamble is indicated by using the SIB.

S406: The network device performs blind detection on the preamble on the PRACH. If the network device detects a random access preamble, the network device reports the random access preamble to media access control (MAC), and subsequently, feeds back, in a random access response window, random access response (RAR) signaling of the MAC on a PDSCH.

S407: The UE receives the RAR signaling, may obtain uplink synchronization based on a time adjustment amount in the RAR signaling, and transmits a message 3 (Msg 3) on an uplink resource allocated by the network device to the UE. The Msg 3 may carry an RRC connection request, or may carry an RRC re-establishment request.

408: The network device sends a message 4 (Msg 4) to the UE. The network device and the UE finally complete contention resolution by using the Msg 4.

In 5G, there may be two uplink carriers in a cell of the UE, for example, one is an NR uplink carrier, and the other is an NR SUL carrier. Therefore, in step S403, the network device needs to notify the UE of information, such as information about reference points, RACH configuration information, an uplink carrier reference signal receiving power (RSRP) selection threshold, and uplink initial BWPs of the two uplink carriers, in the SIB. In this way, the UE may determine, based on the determined uplink carrier that needs to be accessed, information such as an applicable RACH resource, and bandwidth and a frequency domain position that are of the uplink initial BWP, and then initiate a random access process on the carrier. The RSRP may be power measured based on the synchronization signal block, or may be power measured based on a channel state information-reference signal (CSI-RS), or may be power measured based on another reference signal. This is not limited in this embodiment of this application. In a subsequent step, the UE completes an initial network access process on the selected uplink carrier, which may be, for example, the NR SUL carrier or the NR uplink carrier.

It should be understood that the information about the at least two uplink reference points may be included in remaining minimum system information (RMSI) in the SIB, and the RMSI may further include information about at least one downlink reference point. In addition, this embodiment of this application constitutes no limitation to a used SIB message herein.

Optionally, the information about the uplink reference point of the SUL may be included in an SUL common radio resource configuration information element (SUL radio Resource Config Common) in a system broadcast message SIB, and the information about the uplink reference point of the UL may be included in an NR common radio resource configuration information element (NR radio Resource Config Common) in the system broadcast message SIB. Optionally, the information about the uplink reference point of the SUL and an SUL common radio resource configuration information element are parallel, the information about the reference point of the UL and a common radio resource configuration information element are parallel, and are all included in the SIB block. The foregoing two manners are optional. In this embodiment of this application, there is no limitation on a manner in which reference points and carriers are associated in a one-to-one manner, and a name of the information element.

Optionally, the information about the uplink reference point in the system message is indicated in the following manners.

Specifically, the information about the at least two uplink reference points may be explicitly indicated in the system information block. For example, when a downlink carrier and an uplink carrier form an FDD carrier pair, an absolute radio frequency channel number of an uplink reference point of the uplink carrier is broadcast in a system broadcast message. The absolute radio frequency channel number may be similar to a 16-bit (bit) absolute radio frequency channel number (EARFCN) field that is used in LTE to indicate the absolute radio frequency channel number, that is, an evolved universal terrestrial radio access network (Evolved universal terrestrial radio access network, EUTRAN). An EARFCN of an LTE uplink resource can be calculated as follows: $F_{UL}=F_{UL\_low}+0.1 \ (N_{UL}-N_{Offs-UL})$, where $N_{UL}$ is the EARFCN of the LTE uplink resource, $F_{UL}$ is a center frequency of the LTE uplink resource, 0.1 is a grid size 100 kHz of the uplink resource and a downlink resource of an LTE carrier, and $N_{Offs-UL}$ is an EARFCN corresponding to a lowest frequency of a band in which the uplink resource of the LTE carrier is located. Calculation of the EARFCN is associated with a definition of an NR band and a definition of a grid size of an uplink resource and a downlink resource in the band (band). Table 1 is a table of a relationship between the bandwidth and the grid size of the uplink resource and the downlink resource.

TABLE 1

Relationship between bandwidth and a grid size of an uplink resource and a downlink resource

| Band (band) | Downlink | | | Uplink | | |
|---|---|---|---|---|---|---|
| | $F_{UL\_low}$ | $N_{Offs-UL}$ | Change range of $N_{DL}$ | $F_{UL\_low}$ | $N_{Offs-UL}$ | Change range of $N_{UL}$ |
| 1 | 2110 | 0 | 0-599 | 1920 | 13000 | 13000-13599 |
| ... | ... | ... | ... | ... | ... | ... |
| 38 | 2570 | 27675 | 27675-28159 | 2570 | 27675 | 27675-28159 |

When the absolute radio frequency channel number is a position of a subcarrier 0 of a common PRB 0, the absolute radio frequency channel number is a corresponding uplink reference point. When the absolute radio frequency channel number is a center position or another position of the carrier, offset information between the absolute radio frequency channel number and information about the uplink reference point needs to be further indicated in the system broadcast message. An offset granularity may be a quantity of subcarriers of a reference subcarrier spacing, a quantity of PRBs, or a quantity of resource block groups (RBG).

Optionally, the downlink carrier and the uplink carrier are TDD carriers. When a reference point of the uplink carrier is the same as a reference point of the downlink carrier, the uplink reference point corresponding to the uplink carrier does not need to be indicated again, that is, the information about the at least two uplink reference points may also be implicitly indicated in the system information block. Optionally, when the reference point of the uplink carrier is different from the reference point of the downlink carrier, the uplink reference point corresponding to the TDD uplink carrier needs to be further indicated, that is, the information about the at least two uplink reference points still needs to be explicitly indicated in the system information block. In addition, whether the offset information between the absolute radio frequency channel number and the uplink reference point needs to be additionally indicated depends on whether the absolute radio frequency channel number is defined at the position of the subcarrier 0 of the common PRB 0. This is not limited in this embodiment of this application.

Optionally, an index of the uplink reference point may be explicitly indicated in the system message block while the information about the uplink reference point is indicated in the system message block. For example, the system message indicates that an index value of the uplink reference point of the UL carrier is 0, and an index value of the uplink reference point of the SUL carrier is 1, so that a quantity of bits required during explicit indication is related to a quantity of uplink resources broadcast by system information.

Optionally, an index of the uplink reference point may alternatively be implicitly indicated in the system message block, that is, protocol-predefined sorting may be performed based on values of the uplink reference points. For example, sorting is performed in descending order, so that the index of the uplink reference point of the 3.5 G UL is 0, and the index of the uplink reference point of the 1.8 G SUL is 1. This is not limited in this embodiment of this application.

Optionally, the NR radio Resource Config Common may further include at least one of downlink initial access BWP configuration information, RACH configuration information, PUSCH common configuration information, PUCCH common configuration information, SRS common configuration information, common power control configuration information, uplink initial access BWP configuration information, and a physical cell ID of an uplink carrier. When NR UL common resource configuration information does not include the physical cell ID of the uplink carrier, a physical cell ID obtained by calculating a synchronization resource block (SS block) on the downlink carrier is used as an ID of the uplink carrier physical cell. The physical cell ID may be used for calculation such as uplink data scrambling on the UL carrier and an uplink reference signal cyclic shift. An optional value of an NR UL physical cell ID ranges from 0 to 1007. A configured physical cell ID value may not be equal to the physical cell ID obtained by calculating a synchronization signal of the SS block on the downlink carrier. If no physical cell ID is configured, uplink data channel scrambling or a reference signal cyclic shift on the SUL is based on a physical cell ID of the downlink carrier. This is not limited in this embodiment of this application.

Optionally, the NR radio Resource Config Common may include at least one of the RACH configuration information, uplink subcarrier offset information, SUL physical cell ID information, uplink carrier selection threshold information, the PUSCH common configuration information, the PUCCH common configuration information, the SRS common configuration information, the common power control configuration information, and the uplink initial BWP configuration information. When NR SUL common resource configuration information does not include the SUL physical cell ID, a physical cell ID obtained by calculating an SS block on the downlink carrier is used as an ID of the SUL physical cell. The physical cell ID may be used for calculation such as uplink data scrambling on the UL carrier and an uplink reference signal cyclic shift. An optional value of an NR SUL physical cell ID ranges from 0 to 1007. A configured physical cell ID value may not be equal to the physical cell ID obtained by calculating a synchronization signal of the SS block on the downlink carrier. If no physical cell ID is configured, uplink data channel scrambling or a reference signal cyclic shift on the SUL is based on a physical cell ID of the downlink carrier. This is not limited in this embodiment of this application.

Optionally, the RACH configuration information in the SUL radio Resource Config Common and the RACH configuration information in the NR radio Resource Config Common may include at least one of time domain resource information of a RACH (a slot that is of a system frame and in which a preamble may be sent), frequency domain resource information (a frequency domain resource that is of the uplink resource and on which the preamble may be sent) of the RACH, preamble format information (including at least a preamble sequence length, a subcarrier spacing size, a time domain length, and the like) of the RACH, a quantity of preambles, classifications of the preambles, initial receive power, and power ramping information. This is not limited in this embodiment of this application.

Optionally, the uplink resource subcarrier offset information in the SUL radio Resource Config Common includes at least one of an uplink resource subcarrier non-offset configuration mode, an uplink resource subcarrier baseband offset 7.5 kHz, an uplink resource subcarrier radio frequency offset 7.5 kHz, and an uplink resource grid offset 7.5 kHz. The subcarrier spacing of the NR SUL is set to 15 kHz. The baseband offset 7.5 kHz means that an offset of ½ subcarrier is included when a signal is generated, that is, $e^{j2\pi(K+1/2)t}$. The uplink resource radio frequency offset 7.5 kHz means that 7.5 kHz needs to be added to a result obtained after a baseband signal is multiplied by a carrier frequency when the baseband signal is modulated to medium/radio frequency, that is, $e^{j2\pi(f_0+75)t} e^{j2\pi(f_0+75)t}$. The carrier frequency $f_0$ may be a carrier frequency in a bandwidth (band) of LTE. For example, a 10 M carrier at 1930 MHz has an absolute radio frequency channel number 13100. If a 10 MHz SUL carrier is also at 1930 MHz, to ensure that a subcarrier of an LTE carrier is aligned with a subcarrier of the SUL, a grid of the SUL carrier having the absolute radio frequency channel number 13100 has a 7.5 kHz offset. Therefore, for a center of an SUL resource, a frequency actually indicated by the radio frequency channel number 13100 is 1930 MHz+7.5 kHz. Only the SUL radio Resource Config Common information element includes the uplink resource subcarrier offset information.

Optionally, the uplink carrier selection threshold information in the SUL radio Resource Config Common may be a reference signal receiving power (RSRP) value, or may be an offset relative to a downlink carrier camping RSRP value (cell camping RSRP threshold+offset). In step S403, when the RSRP value measured by the UE is greater than an uplink carrier selection RSRP threshold, the UE selects to initiate initial access on the UL. When the RSRP measured by the UE is less than the value, the UE initiates the initial access on the SUL. Only the SUL radio Resource Config Common information element includes uplink resource subcarrier offset information. Optionally, the uplink carrier selection threshold information may alternatively be included in another information element of the SIB, and this is not limited in this application.

An LTE cell selection is used as an example for description. Srxlev=Qrxlevmeas−(Qrxlevmin+Qrxlevminoffset)−Pcompensation. Qrxlevmeas is an RSRP result measured by the UE based on a cell-based CRS, Qrxlevmin is an RSRP selection threshold value broadcast by an LTE cell, a range of Qrxlevmin is (−70 to −22)*2 dBm, Qrxlevminoffset is a cell priority setting, and Pcompensation is a compensation amount between a maximum transmit power of a user and an allowed maximum transmit power of the cell. When the maximum transmit power of the user is greater than the allowed maximum power of the cell, Pcompensation=0; and when the maximum transmit power of the user is less than the allowed maximum power of the cell, Pcompensation is equal to an absolute value of a difference the maximum transmit power of the user and the allowed maximum power of the cell. It is assumed that the maximum power of the user is greater than or equal to the allowed maximum power of the cell, and the cell priority setting is 0, when an RSRP value measured by the user is greater than the RSRP threshold broadcast by the cell, the UE camps on the cell and may further perform random access.

When the network device directly broadcasts the uplink carrier selection threshold, when the uplink carrier selection threshold is equal to a downlink carrier camping threshold, it means that all UEs that select to camp on the downlink carrier select to perform random access on the UL. When the uplink carrier selection threshold is greater than a maximum cell camping threshold (−44 dB), all UEs select to perform random access on the SUL.

Optionally, when the uplink carrier selection threshold is represented by using an offset, a code point (code point) of the offset is (0 to 31)*2 dB, so that an offset 0 means that all UEs perform random access on the 3.5 G UL. When a broadcast offset is a maximum value 62 dB, it is predefined in a protocol that all the UEs perform random access on the 1.8 G SUL, or a code point in the offset represents an infinitely large offset. A notification form and range of the RSRP are not limited in this embodiment of this application.

Optionally, when the uplink carrier selection threshold is not included, all the UEs select to perform random access on the 3.5 G UL, that is, select an uplink carrier whose uplink reference point index is 0 for random access.

Optionally, the uplink initial BWP configuration information in the NR radio Resource Config Common and the uplink initial BWP configuration information in the SUL radio Resource Config Common may include at least one of uplink initial BWP bandwidth, an offset relative to an uplink reference point, and a subcarrier spacing. Granularities indicated by the uplink initial BWP bandwidth and the offset may be the indicated subcarrier spacing, or a PRB or an RBG based on the indicated carrier spacing.

Optionally, the PUSCH common configuration information in the NR radio Resource Config Common and the PUSCH common configuration information in the SUL radio Resource Config Common may include configuration information related to PUSCH frequency hopping, a quantity of frequency hopping subbands, a frequency hopping mode, a frequency hopping PRB offset, and the like. This is not limited in this embodiment of this application.

Optionally, the SRS common configuration information in the NR radio Resource Config Common and the SRS common configuration information in the SUL radio Resource Config Common may include cell-level transmission bandwidth configuration, cell-level transmission slot configuration, and information indicating whether a cell-level ACK/NACK and a cell-level SRS are simultaneously transmitted (True/false). This is not limited in this embodiment of this application.

Optionally, the PUCCH common configuration information in the NR radio Resource Config Common and the PUCCH common configuration information in the SUL radio Resource Config Common may include information indicating an ACK/NACK resource index and simultaneous transmission of the PUCCH and PUSCH (True/false). This is not limited in this embodiment of this application.

Optionally, the common power control configuration information in the NR radio Resource Config Common and the common power control configuration information in the SUL radio Resource Config Common includes information such as cell-level PUSCH expected receive power (p0_nominalPUSCH), cell-level PUCCH expected receive power (p0_nominalPUCCH), a partial path loss compensation factor (alpha), a random access preamble message 3 (delta Preamble Msg 3), and a preamble used to select a group A or a group B. The p0_nominalPUSCH on an SUL resource and the p0_nominalPUSCH on an UL resource may be respectively represented as p0_nominalPUSCH_SUL and p0_nominalPUSCH_UL. Because the SUL and the UL are in different frequency bands, for example, 1.8 GHz and 3.5 GHz, a difference between the frequency bands of the two is excessively large, and propagation losses and penetration losses are different. Based on a UMa path loss model and an O2I penetration loss model in TS 38.901, path loss differences and penetration loss differences in some typical frequency bands may be obtained. Therefore, based on a difference between the downlink frequency band and the SUL frequency band, the network device may set the expected power on the SUL plus an offset value (offset) shown in Table 2 while setting the cell-level expected power p0_nominalPUSCH on the UL resource, and the offset is related to an SUL frequency and a UL frequency. Similarly, the cell-level PUCCH expected receive power is similar to the foregoing setting, and cell-level RACH initial expected receive power is similar to the foregoing setting. Table 2 shows data of path losses differences and penetration loss differences of different carrier frequency bands. It can be learned from Table 2 that, for different carrier frequency bands, the path loss differences and the penetration loss differences are different.

TABLE 2

Path losses differences and penetration losses differences of different carrier frequency bands

| | Frequency band | | |
|---|---|---|---|
| | 1.8 G (SUL)-3.5 G (UL) | 700 M (SUL)-4.2 G (UL) | 600 M (SUL)-5 G (UL) |
| Path loss difference (dB) | −5.1 | −10.6 | −12.3 |
| Penetration loss difference (dB) | −5.8 | −15.6 | −18.4 |
| Total difference (dB) | −10.9 | −26.2 | −30.7 |

The uplink initial BWP information in the NR radio Resource Config Common and the uplink initial BWP information in the SUL radio Resource Config Common includes a BWP size (including a quantity of PRBs), a subcarrier spacing, and an SUL uplink reference point offset (a unit is a PRB of a reference subcarrier spacing). The UE may send at least one of the ACK/NACK of the Msg 3 and the ACK/NACK of the Msg 4 on the uplink initial BWP. Optionally, a RACH frequency domain resource may be included in the uplink initial BWP. This is not limited in this embodiment of this application.

Optionally, in an embodiment, the method 200 further includes the following steps.

S240: The network device generates radio resource control RRC connection establishment information or RRC connection re-establishment information or RRC connection reconfiguration information, where the RRC connection establishment information or the RRC connection re-establishment information or the RRC connection reconfiguration information includes the information about at least one of the uplink reference points.

S250: The network device sends the RRC connection establishment information or the RRC connection re-establishment information or the RRC connection reconfiguration information to the terminal device.

S260: The terminal device determines, based on the RRC connection establishment information or the RRC connection re-establishment information or the RRC connection reconfiguration information, an uplink carrier resource used for uplink transmission.

Specifically, after the initial access of the cell is completed and the RRC connection is established based on the steps shown in FIG. 4, the network device generates the radio resource control RRC connection establishment information or the RRC connection re-establishment information or the RRC connection reconfiguration information, which are used to configured information required by the UE to perform uplink data transmission, uplink PUCCH transmission, SRS transmission, and the like.

The RRC connection establishment information or the RRC connection re-establishment information or the RRC connection reconfiguration information further includes at least one of uplink BWP configuration information of the terminal device, physical uplink control channel PUCCH configuration information, and sounding reference signal SRS information of the terminal device. In the initial access process, the terminal device has obtained reference points corresponding to all uplink carriers in the cell that the terminal device accesses. Therefore, the RRC connection establishment information or the RRC connection re-establishment information needs to include only information about at least one of the uplink reference points, that is, the uplink carrier resource on which an uplink resource configured in the RRC connection establishment or re-establishment signaling or the RRC connection reconfiguration message is based needs to be indicated. The following uses the RRC connection establishment message as an example. This is not limited in this application.

Optionally, the RRC connection establishment information (signaling) includes at least one of bandwidth information included in an UL BWP, the information about the uplink reference point, offset information of the UL BWP relative to the uplink reference point, waveform information, a cyclic prefix type, and a subcarrier spacing. The information about the uplink reference point in the RRC connection establishment information may be an uplink reference point index, an absolute radio frequency channel number value of the uplink reference point, or may be represented as an UL CC index (one UL CC has one uplink reference point). Optionally, when a UE-level UL BWP is configured in the RRC connection establishment information (signaling), the configuration information includes at least one of a PUCCH-occupied PRB size, a PRB offset, and the information about the uplink reference point. This is not limited in this embodiment of this application.

Optionally, the RRC connection establishment information further includes a UL BWP index number. In this case, PUSCH transmission on the SUL or the UL may be implemented through scheduling by this carrier and by activating a UL BWP on the SUL or activating a UL BWP on the UL. When a plurality of activated BWPs are supported, PUSCH transmission on the SUL and the UL may be implemented through cross-BWP scheduling. Therefore, the UL BWPs on the SUL and the UL BWPs on the UL are uniformly numbered, so that PUSCH transmission in which the SUL is scheduled does not need cross-carrier scheduling, where the cross-carrier scheduling increases a quantity of times of blind detection performed by the UE, and increases power consumption of the UE. The UL BWP on the UL or the SUL can be quickly activated or deactivated by using downlink control information (DCI).

Optionally, when the RRC connection establishment information is used to configure a UE-level periodic SRS, configuration information includes at least one of a subcarrier spacing of the SRS, a slot-level period, a slot-level offset, total frequency hopping bandwidth of the SRS, transmission bandwidth of the SRS, an offset of the total frequency hopping bandwidth of the SRS, and the information about the uplink reference point. The information about the uplink reference point in the SRS configuration information may be an uplink reference point index, or may be an absolute radio frequency channel number value of the uplink reference point. This is not limited in this embodiment of this application.

Optionally, when the RRC connection establishment information is used to configure a UE-level semi-static SRS, configuration information includes at least one of a subcarrier spacing of the SRS, a slot-level period, a slot-level offset, total frequency hopping bandwidth of the SRS, transmission bandwidth of the SRS, an offset of the total frequency hopping bandwidth of the SRS, and the information about the uplink reference point. The information about the uplink reference point in the SRS configuration information may be an uplink reference point index, or may be an absolute radio frequency channel number value of the uplink reference point. Optionally, the configuration information further includes a semi-static SRS resource index number. Therefore, semi-static SRS resources on the SUL and on the UL are uniformly numbered, and when one or more semi-static SRSs are activated or deactivated by using MAC channel element (CE) signaling, uplink carrier information does not need to be additionally indicated. This is not limited in this embodiment of this application.

Optionally, when the RRC connection establishment information is used to configure a UE-level aperiodic SRS, configuration information includes at least one of a subcarrier spacing of the SRS, transmission bandwidth of the SRS, an offset of the transmission bandwidth of the SRS, and the information about the uplink reference point. The information about the uplink reference point in the SRS configuration information may be an uplink reference point index, or may be an absolute radio frequency channel number value of the uplink reference point. Optionally, the configuration information further includes an aperiodic SRS resource index number. Therefore, aperiodic SRS resources on the SUL and on the UL are uniformly numbered, and when an aperiodic SRS on the SUL or on the UL is activated by using DCI signaling, uplink carrier information does not need to be additionally indicated, thereby reducing signaling overheads. This is not limited in this embodiment of this application.

Optionally, when the RRC connection establishment information is used to configure a UE-level PUCCH resource, configuration information includes at least one of a subcarrier spacing used by a PUCCH, bandwidth of the PUCCH, an offset of the PUCCH, and the information about the uplink reference point. The information about the uplink reference point in the PUCCH resource configuration information may be an uplink reference point index, or may be an absolute radio frequency channel number value of the uplink reference point. Optionally, the configuration information further includes a PUCCH resource index number.

Optionally, at least one of the RRC connection establishment information, the RRC connection re-establishment information, and the RRC connection reconfiguration information further includes dedicated resource configuration information (for example, serving cell configuration information (serving Cell Config)). The dedicated resource configuration information includes UL-dedicated configuration information (uplink config), SUL-dedicated configuration information (supplementary uplink), and downlink BWP-dedicated configuration information (bwp-dedicate). The UL-dedicated configuration information and the SUL-dedicated configuration information each include respective uplink BWP configuration information (UplinkConfig). Optionally, information about an uplink reference point of the UL and information about an uplink reference point of the SUL each may be implicitly or explicitly indicated by using respective dedicated configuration information.

The UL and the SUL may use different subcarrier spacings. For example, the UL uses a subcarrier spacing of 30 kHz, and the SUL uses a subcarrier spacing of 15 kHz. Therefore, latency between uplink scheduling grant and uplink data transmission on the UL and latency between uplink scheduling grant and uplink data transmission on the SUL should be separately configured on each carrier. Two main configuration manners are as follows:

An optional configuration manner is: The downlink BWP-dedicated configuration information includes PDCCH-dedicated configuration information (pdcch-config). The PDCCH-dedicated configuration information (pdcch-config) includes time domain resource allocation (time domain resource allocation) information. The time domain resource allocation information includes a PUSCH time domain allocation list (UL-PUSCH-Allocation List) of the UL carrier and a PUSCH time domain allocation list (SUL-PUSCH-Allocation List) of the SUL carrier. The PUSCH time domain allocation list (UL-PUSCH-Allocation List) of the UL carrier includes N1 rows of PUSCH time domain resource allocation (PUSCH-Time Domain Resource Allocation) parameters. The PUSCH time domain allocation list (SUL-PUSCH-Allocation List) of the SUL carrier includes N2 rows of PUSCH time domain resource allocation (PUSCH-Time Domain Resource Allocation) parameters. N1 and N2 are positive integers. A row of the PUSCH time domain resource allocation (PUSCH-Time Domain Resource Allocation) parameters include parameters such as latency K2 between uplink grant and PUSCH transmission, a unit of K2 being a slot or symbol of PUSCH transmission, a mapping type (type) of a PUSCH demodulation reference signal (DMRS), a value of the mapping type being TypeA (indicating that the DMRS is located in a symbol #2 and/or a symbol #3 of a slot) or TypeB (a start symbol of PUSCH transmission), a PUSCH time-domain start symbol, and a PUSCH time domain length. For example, a row of the PUSCH time domain resource allocation parameters in the PUSCH time domain allocation list of the SUL carrier may be used to indicate parameters such as latency K2 between uplink grant of the SUL carrier and PUSCH transmission of the SUL carrier, a mapping type of a PUSCH DMRS of the SUL carrier, a PUSCH time-domain start symbol of the SUL carrier, and a PUSCH time-domain length of the SUL carrier. N rows of the PUSCH time domain allocation parameters configured by using higher layer RRC signaling determine that a quantity of bits of time domain scheduling information included in downlink scheduling information (Downlink Control Information, DCI) of the uplink scheduling grant is $\log_2 N$ ($\log_2 N$ is rounded up). N is a larger value between N1 and N2. Therefore, when a bit value in a time domain scheduling information field included in the DCI of the uplink grant is n, it indicates that the uplink scheduling latency K2, the mapping type of the PUSCH DMRS, the PUSCH time-domain start symbol, and the PUSCH time-domain length use an $n^{th}$ row of parameters in the list. In addition, when the higher layer signaling indicates that the PUSCH may be dynamically switched on the UL carrier or the SUL carrier, a UL/SUL indicator (indicator) in the DCI of the uplink grant indicates whether the PUSCH time domain allocation list of the UL carrier or of the SUL carrier is used. Optionally, when the higher layer signaling does not indicate that the PUSCH may be dynamically switched on the UL carrier or the SUL carrier, a value indicated by the time domain scheduling information field in the DCI of the uplink scheduling is set based on a time domain allocation list for a PUCCH carrier.

Optionally, the PDCCH-dedicated configuration information (pdcch-config) includes the time domain resource allocation (time domain resource allocation) information. The time domain resource allocation information may further include UL-PUSCH aggregation level information (UL-pusch-Aggregation Factor) and SUL-PUSCH aggregation level information (SUL-pusch-Aggregation Factor). This is not limited in this embodiment of this application.

Another optional configuration manner is: Uplink BWP-dedicated configuration information (Uplink BWP-Dedicated) of the UL and uplink BWP-dedicated configuration information (Uplink BWP-Dedicated) of the SUL respectively include PUSCH-dedicated configuration information (pusch-Config) of the UL and PUSCH-dedicated configuration information (pusch-Config) of the SUL. The PUSCH-dedicated configuration information of the SUL and the PUSCH-dedicated configuration information of the UL respectively include time domain resource allocation information of the SUL and time domain resource allocation information of the UL. A PUSCH time domain allocation list (PUSCH-Allocation List) of the SUL carrier and a PUSCH time domain allocation list of the UL carrier are included in the time domain resource allocation information. The PUSCH time domain allocation list includes N rows of time domain resource allocation (PUSCH-Time Domain Resource Allocation) parameters. A row of the PUSCH time domain resource allocation parameters include parameters such as latency K2 between uplink grant and PUSCH transmission, a unit of K2 being a slot or symbol of PUSCH transmission, a mapping type of a PUSCH demodulation reference signal (DMRS), a value of the mapping type being TypeA (indicating that the DMRS is located in a symbol #2 and/or a symbol #3 of a slot) or TypeB (a start symbol of PUSCH transmission), a PUSCH time-domain start symbol, and a PUSCH time domain length. For example, the time domain resource allocation information included in the PUSCH-dedicated configuration information of the UL includes the PUSCH time domain allocation list (PUSCH-Allocation List) of the UL. The PUSCH time domain allocation list of the UL includes N rows of time domain resource allocation (PUSCH-Time Domain Resource Allocation) parameters. A row of time domain resource allocation parameters include information such as the latency K2 between uplink grant and PUSCH transmission of the UL carrier, a mapping type of a PUSCH DMRS of the UL carrier, a PUSCH time-domain start symbol of the UL carrier and a PUSCH time-domain length of the UL carrier. N rows of the PUSCH time domain allocation parameters configured by using higher layer RRC signaling determine that a quantity of bits of time domain scheduling information included in DCI of uplink scheduling grant is log 2N (log 2N is rounded up). Therefore, when a bit value in a time domain scheduling information field included in the DCI of the uplink grant is n, it indicates that the uplink scheduling latency K2, the mapping type of the PUSCH DMRS, the PUSCH time-domain start symbol, and the PUSCH time-domain length use an $n^{th}$ row of parameters in the list. In addition, when the higher layer signaling indicates that the PUSCH may be dynamically switched on the UL carrier or the SUL carrier, a UL/SUL indicator in the DCI of uplink grant indicates whether the PUSCH time domain allocation list of the UL carrier or of the SUL carrier is used. Optionally, when the higher layer signaling does not indicate that the PUSCH may be dynamically switched on the UL carrier or the SUL carrier, a value indicated by the time domain scheduling information field in the DCI of the uplink scheduling is set based on a time domain allocation list for a PUCCH carrier.

Optionally, the PUSCH-dedicated configuration information (pusch-Config) of the PUSCH of the UL and of the PUSCH of the SUL may directly include respective time-domain allocation list (PUSCH-Allocation List) information and PUSCH aggregation level information (pusch-Aggregation Factor). This is not limited in this embodiment of this application.

It should be understood that, in this embodiment of this application, S240 to step S260 in the method 200 may be individually performed. In other words, in this embodiment of this application, S240 to step S260 may not depend on step S210 to step S230.

Optionally, in an embodiment, the RRC connection reconfiguration information further includes target cell configuration information. The target cell configuration information includes the uplink resource configuration information. The method 200 further includes: performing, by the terminal device, target cell handover based on the target cell configuration information.

Specifically, when the UE performs cell handover, when uplink resource selection decision is made in a target cell: A source cell notifies the target cell of an RSRP measurement result and a handover request of the UE on a downlink carrier of the target cell over an X2/Xn interface; and the target cell notifies the source cell of the target cell configuration information, for example, common configuration information of the target cell, UE-level configuration information, and UE-exclusive preamble information, over the X2/Xn interface, and the source cell sends the configuration information to the UE by using the RRC connection reconfiguration signaling.

The common configuration information of the target cell includes the NR radio Resource Config Common (including an uplink configuration part and a downlink configuration part) and the SUL radio Resource Config Common (including SUL configuration information), and the UE-level configuration information includes an uplink BWP configuration part and a downlink BWP configuration part. The uplink BWP configuration part includes the information about the uplink reference point, the UE-exclusive preamble information includes a random access preamble index (ra-Preamble-Index), a physical random access channel index (ra-PRACH-Mask-Index), and the information about the uplink reference point. The ra-Preamble-Index is used to indicate the UE preamble information. The ra-PRACH-Mask-Index is used to indicate information used for sending a random access resource in a system frame, and the information about the uplink reference point is used to indicate whether the UE initiates random access on an NR UL uplink resource or an NR SUL uplink resource. The UE-exclusive preamble information is included in a random access channel dedicated configuration (rach-Config Dedicated/CFRA) information element, the rach-Config Dedicated/CFRA information element is included in a mobility control information (mobility Control Info) information element, and the mobility Control Info information element is included in the RRC connection reconfiguration signaling.

When uplink resource selection decision is made in the source cell: The source cell and the target cell exchange some configuration information of the target cell (one downlink reference point, at least two uplink reference points, and an uplink carrier selection RSRP threshold); and the source cell sends the handover request and an uplink resource decision result to the target cell over the X2/Xn interface based on the RSRP measurement result reported by the UE. The decision result may be represented by an absolute indication value of the uplink reference point, or may be represented by an uplink reference point identifier.

Optionally, the decision result of the source cell may further include contention-free random access resource information.

The target cell sends the common configuration information of the target cell, the UE-level configuration information, and the UE-exclusive preamble information to the source cell over the X2/Xn interface, and the source cell sends the configuration information to the UE by using the RRC signaling.

The common configuration information of the target cell includes radio Resource Config Common (including an uplink configuration part and a downlink configuration part) and SUL radio Resource Config Common (including SUL configuration information), and the UE-level configuration information includes an uplink BWP configuration part and a downlink BWP configuration part. The uplink BWP configuration part includes the information about the uplink reference point. The UE-exclusive preamble information includes a ra-Preamble-Index and a ra-PRACH-Mask-Index. The ra-Preamble-Index is used to indicate the UE preamble information. The ra-PRACH-Mask-Index is used to indicate information used for sending a random access resource in a system frame. The UE-exclusive preamble information is included in a rach-ConfigDedicated/CFRA information element, the rach-ConfigDedicated/CFRA information element is included in a mobility Control Info information element, and the mobility Control Info information element is included in the RRC connection reconfiguration signaling.

Optionally, the uplink reference point and the contention-free access resource that are returned by the target cell may be different from the uplink reference point and the contention-free random access resource that are decided by the source cell.

Optionally, in an embodiment, an indicator of the information about the uplink reference point may include an index indicating the uplink reference point, or may indicate an absolute radio frequency channel number value of the uplink reference point. This is not specifically limited in this embodiment of this application.

Therefore, when the UE initiates initial access on the SUL, PUSCH scheduling on the SUL may be implemented by scheduling the carrier. Compared with a case in which SUL can be implemented only through cross-carrier scheduling in LTE, a quantity of times of blind detection of the user may be reduced, thereby saving energy. When the UE triggers aperiodic SRS transmission on the UL, DCI signaling does not need to additionally indicate uplink carrier information, thereby reducing DCI overheads and determining uplink carrier resource information during cell handover.

Optionally, in an embodiment, the information about the uplink reference point may be explicitly or implicitly indicated. The information about the uplink reference point includes at least one of an absolute frequency position corresponding to the uplink reference point and a reference point index value corresponding to the uplink reference point. The uplink reference point is an absolute position of a subcarrier 0 of a common physical resource block index 0 of the uplink carrier, and the absolute position may be identified as an absolute radio frequency channel number.

When an NR uplink carrier, an NR downlink carrier, and an NR SUL carrier are considered as two cells, a cell includes a plurality of carrier pairs for the network device. For the terminal device, a cell includes only one carrier pair. An indicator of the information about the uplink reference point is similar to that in the foregoing embodiments.

When the initial access of the cell is completed and the RRC connection is established based on the steps shown in FIG. 4, the uplink carrier accessed by the terminal device is an uplink carrier in a primary cell carrier pair (PCC Pair), and the uplink carrier in the PCC pair is an uplink primary carrier. The following signaling uses the RRC connection establishment information as an example, or may be an RRC connection re-establishment message or an RRC connection reconfiguration message. This is not limited in this embodiment of this application.

In this case, when the RRC connection establishment information (RRC signaling configuration) includes a UE-level BWP, the configuration information includes at least one of the bandwidth information included in the UL BWP, the offset information of the UL BWP relative to the uplink reference point, the waveform information, the CP type, and the subcarrier spacing. Optionally, the configuration information further includes the UL BWP index number.

Optionally, when the RRC connection establishment information configures a UE-level periodic SRS, configuration information includes at least one of a subcarrier spacing of the SRS, a slot (slot)-level period, a slot-level offset, total frequency hopping bandwidth of the SRS, transmission bandwidth of the SRS, and an offset of the total frequency hopping bandwidth of the SRS. This is not limited in this embodiment of this application.

Optionally, when the RRC connection establishment information configures a UE-level semi-static SRS, configuration information includes at least one of a subcarrier spacing of the SRS, a slot-level period, a slot-level offset, total frequency hopping bandwidth of the SRS, transmission bandwidth of the SRS, and an offset of the total frequency hopping bandwidth of the SRS. Optionally, the configuration information further includes a semi-static SRS resource index number. Therefore, semi-static SRS resources on the SUL and the UL are uniformly numbered, and when one or more semi-static SRSs are activated or deactivated by using MAC channel element (CE) signaling, uplink carrier information does not need to be additionally indicated. This is not limited in this embodiment of this application.

Optionally, when the RRC connection establishment information configures a UE-level aperiodic SRS, configuration information includes at least one of a subcarrier spacing of the SRS, transmission bandwidth of the SRS, and an offset of the transmission bandwidth of the SRS. Optionally, the configuration information further includes an aperiodic SRS resource index number.

Optionally, when the RRC connection establishment information configures a UE-level PUCCH resource, configuration information includes at least one of a subcarrier spacing used by the PUCCH, bandwidth of the PUCCH, and position information of the PUCCH. Optionally, the configuration information further includes a PUCCH resource index number.

The foregoing signaling uses the RRC connection establishment information as an example, and may alternatively be an RRC connection re-establishment message or an RRC connection reconfiguration message. This is not limited in this embodiment of this application.

Figure 5:
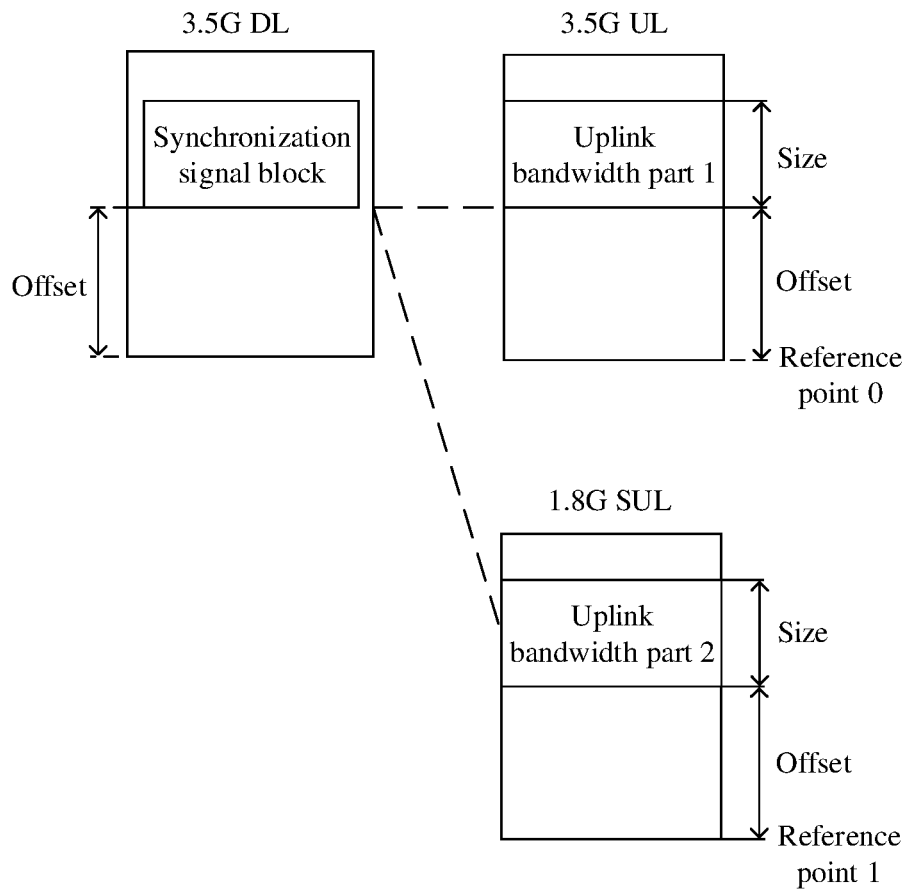
FIG. 5 is a schematic diagram showing that a terminal device adds a secondary cell carrier pair according to an embodiment of this application.

When the UE needs to use a resource of another uplink carrier in the system broadcast message, configuration may be performed by adding RRC connection reconfiguration information (RRC connection reconfiguration signaling) of a secondary cell carrier pair (SCC Pair). The RRC connection reconfiguration signaling includes at least one of SCC pair information, common resource configuration information of a downlink carrier, common resource configuration information of the uplink carrier, UE-level DL BWP configuration information, UE-level UL BWP configuration information, SCC pair index information (using a carrier indicator field (CIF) of an SCell), and UE-level SRS configuration information. The SCC pair information may include at least one of a pair (a downlink reference point and an uplink reference point), a physical cell ID of a downlink carrier in a CC pair, the downlink reference point and first offset information of a synchronization signal block (SS block). Optionally, the SCC pair information may further include at least one of the SS block and second offset information of a PRB grid. The SCC pair index information may be explicitly indicated as any value in 1 to 15. Optionally, an index of a CC pair including another UL component carrier (CC) and a downlink CC in the system broadcast message may be equal to 1 by default (similar to a case in which an index of the PCC pair is equal to 0 by default). In this case, the downlink CC on which the UE camps and the uplink CC selected to send a RACH constitute the PCC pair. For example, FIG. 5 is a schematic diagram of adding a secondary cell carrier pair according to an embodiment of this application. When the uplink CC used by the UE to send the RACH is a 1.8 G SUL, PUSCH scheduling on the 1.8 G SUL can be implemented by scheduling the carrier. A case in which a 3.5 G DL and a 3.5 G UL are considered as primary carriers by default, and the 1.8 G SUL can only be scheduled by crossing carriers is avoided, increasing a quantity of times of blind detection of the UE.

Optionally, in an embodiment, the RRC connection reconfiguration information further includes secondary cell related information, and the secondary cell related information is used to determine at least one of a physical cell identifier ID of a synchronization signal block SSB associated with a secondary cell carrier, frequency domain information of the SSB associated with the secondary cell carrier of the terminal device, and information about a downlink reference point of the secondary cell carrier of the terminal device. The method 200 further includes: adding, by the terminal device, the secondary cell carrier (the secondary cell carrier in this application may be referred to as a secondary carrier or a secondary cell) based on the RRC connection reconfiguration information.

Specifically, the network device may further add a secondary cell carrier without the synchronization signal block SSB for the UE. In this case, the network device needs to notify the terminal device of related information of the secondary cell carrier without the SSB, so that the terminal device adds the cell without the SSB as the secondary cell carrier of the terminal device.

Figure 6:
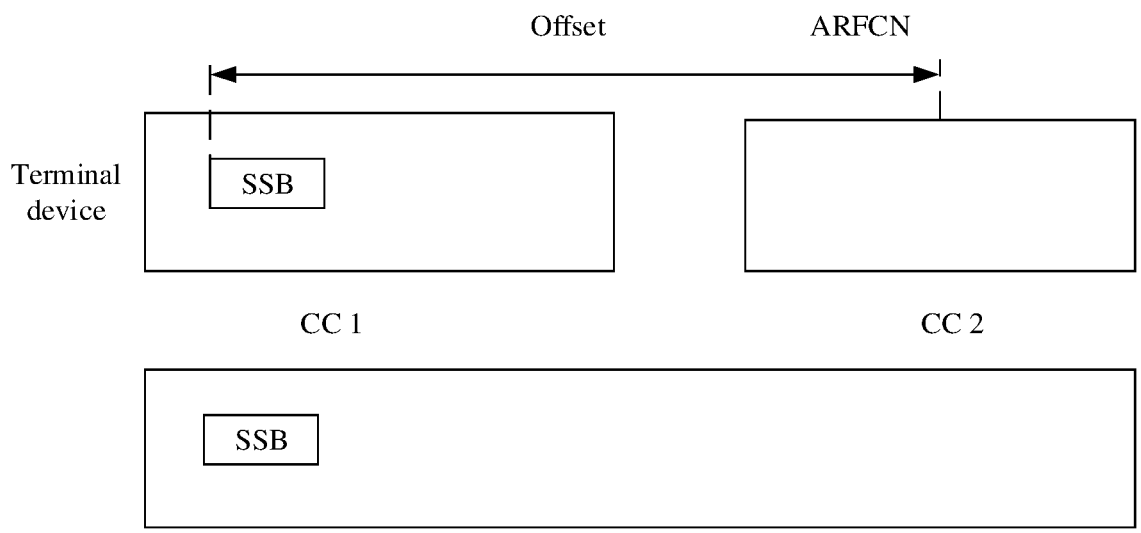
FIG. 6 is a schematic diagram showing that a secondary cell carrier without an SSB is added for a terminal device according to an embodiment of this application.

FIG. 6 is a schematic diagram showing that a secondary cell carrier without an SSB is added for a terminal device. As shown in FIG. 6, when a network device adds a CC 2 (without an SSB) as the secondary cell carrier for UE, RRC connection reconfiguration information (RRC connection reconfiguration signaling) or RRC configuration signaling sent by the network device to the UE needs to include related information of the secondary cell carrier (CC 2). The related information of the secondary cell carrier includes at least one of information about a downlink reference point of the secondary cell carrier, a physical cell identifier (ID) of an SSB associated with the secondary cell carrier, or frequency domain information of the SSB associated with the secondary cell carrier.

The following uses an example in which the secondary cell carrier is the CC 2 shown in FIG. 6 for description. In FIG. 6, CC 1 is a primary carrier accessed by the UE, and a carrier associated with the CC 2 may be the CC 1, or may be another carrier.

The information about the downlink reference point of the secondary cell carrier in the RRC connection reconfiguration information may be a radio frequency channel number (ARFCN) of the secondary cell. For example, the information about the downlink reference point of the secondary cell carrier in the RRC connection reconfiguration information may be an ARFCN of the CC 2. A value of the physical cell ID of the synchronization signal block associated with the CC 2 may range from 0 to 1007. The frequency domain information of the SSB associated with the CC 2 may be offset information between the SSB associated with the CC 2 and the downlink reference point of the CC 2. The offset information herein may be a quantity of offset PRBs between the synchronization signal block associated with the CC 2 and the downlink reference point of the CC 2, or may be a quantity of offset subcarriers between the synchronization signal block associated with the CC 2 and the downlink reference point of the CC 2. A subcarrier spacing of the PRB may be a subcarrier spacing used by the SSB associated with the CC 2, and the subcarrier spacing may be a predefined reference subcarrier spacing (for example, for a carrier in a frequency band below 6 GHz, the predefined reference subcarrier spacing may be set to 15 kHz). The predefined reference subcarrier spacing may be set to 60 kHz for a carrier in a frequency band above 6 GHz. The predefined subcarrier spacing may alternatively be 30 kHz, 120 kHz, 240 kHz, or the like, or may be a subcarrier spacing indicated by using higher layer signaling. Optionally, the frequency domain information of the SSB associated with the secondary cell carrier may include a frequency domain position reference value of the SSB (SSREF) associated with the secondary cell carrier. Alternatively, the frequency domain information of the SSB associated with the secondary cell carrier may further include a number of a frequency band in which the SSB associated with the secondary cell carrier (CC 2) is located. Alternatively the frequency domain information of the SSB associated with the secondary cell carrier may further include another frequency domain parameter or other frequency domain information of the SSB associated with the secondary cell carrier. This is not limited in this embodiment of this application.

A grid definition of the synchronization signal block SSB is shown in Table 3. From 0 to 2650 MHz, a grid of the SSB is 900 kHz, and the SSB may be mapped at a grid of 900 kHz±5 kHz. Optionally, a subcarrier 0 of a PRB 10 of the SSB is mapped to the grid. For example, mapping of an SSB may exist at frequency domain positions of grids 895/900/905 kHz and 1795/1800/1805 kHz. Mark numbers at these grids may also be referred to as frequency domain position reference values of the synchronization signal blocks (SSB reference, SSREF). Therefore, the frequency domain information of the SSB associated with the secondary cell carrier may be an SSREF value of the SSB associated with the secondary cell carrier.

quency domain information of the SSB associated with the secondary cell carrier may be the SSREF value of the SSB associated with the secondary cell carrier. Alternatively, the frequency domain information of the SSB associated with the secondary cell carrier may be an ARFCN value of a carrier on which the SSB associated with the secondary cell carrier is located offset information of the SSB, and the like. This is not limited in this embodiment of this application.

It should be understood that when the network device adds a secondary cell with a synchronization signal block SSB for the UE, the physical cell identifier ID of the synchronization signal block SSB associated with the secondary cell carrier of the terminal device may be a physical cell identifier ID of the SSB of the secondary cell carrier, and the frequency domain information of the SSB associated with the secondary cell carrier of the terminal device may be frequency domain information of the SSB of the secondary cell carrier. This is not limited in this embodiment of this application.

When the RRC connection reconfiguration signaling includes a plurality of UE-level DL BWP configurations, a DL BWP is a default DL BWP. When the RRC connection reconfiguration signaling includes a plurality of UE-level UL BWP configurations, a DL BWP is a default UL BWP. When an SCC pair is activated by using control signaling

TABLE 3

| Grid parameters of global synchronization signal blocks | | |
|---|---|---|
| Frequency domain range | Frequency domain position of a synchronization signal block | Range of a frequency domain position reference value of the synchronization signal block |
| 0-2650 MHz | N * 900 kHz + M * 5 kHz, N = 1:[2944], M = −1:1 | 1-[8832] |
| 2400-24250 MHz | 2400 MHz + N * 1.44 MHz, N = 0:[15173] | [8833-24006] |

Optionally, when the CC 2 without the SSB is added as the secondary cell carrier for the UE, it may be predefined in a protocol that the secondary cell CC 2 without the SSB is associated with the primary carrier or primary cell that the UE accesses. In addition, if the secondary cell CC 2 without the SSB is a secondary cell of an LTE/NR secondary base station (SeNB/SgNB) in a dual-connectivity scenario, it may be predefined in the protocol that the secondary cell carrier CC2 without the SSB is associated with a primary secondary cell under the secondary base station SeNB/SgNB of the UE. Therefore, the related information of the secondary cell included in the RRC connection reconfiguration information may include the information about the downlink reference point (such as the ARFCN) of the secondary cell.

Optionally, when the CC2 without the SSB is added as the secondary cell carrier for the UE, the related information of the secondary cell carrier included in the RRC connection reconfiguration information includes the information about the downlink reference point (such as the ARFCN) of the secondary cell carrier. In addition, the RRC connection reconfiguration information may further include the information about the downlink reference point of the secondary cell carrier and information about the SSB associated with the secondary cell carrier. The information about the SSB associated with the secondary cell carrier may include at least one of the frequency domain information of the SSB associated with the secondary cell carrier, the physical cell ID of the associated SSB, and the number of the band in which the associated SSB is located. Optionally, the fre- (which may be DCI, MAC, or RRC, and is not limited), the UE works on the default DL/UL BWP by default. When the DL BWP or the UL BWP is configured, the RRC connection reconfiguration signaling includes at least one of a subcarrier spacing of the BWP, a quantity of PRBs included in the BWP, and an offset of the BWP relative to an uplink reference point.

When the RRC reconfiguration signaling configures a UE-level periodic SRS, configuration information includes at least one of a subcarrier spacing of the SRS, a slot-level period, a slot-level offset, total frequency hopping bandwidth of the SRS, transmission bandwidth of the SRS, and an offset of the total frequency hopping bandwidth of the SRS.

When the RRC reconfiguration signaling configures a UE-level semi-static SRS, configuration information includes at least one of a subcarrier spacing of the SRS, a slot-level period, a slot-level offset, total frequency hopping bandwidth of the SRS, transmission bandwidth of the SRS, and an offset of the total frequency hopping bandwidth of the SRS. Optionally, the RRC signaling further includes a semi-static SRS resource index number. In this way, one or more semi-static SRSs may be activated or deactivated by using MAC CE signaling of cross-carrier scheduling.

When the RRC reconfiguration signaling configures a UE-level aperiodic SRS, configuration information includes at least one of a subcarrier spacing of the SRS, transmission bandwidth of the SRS, and an offset of the transmission bandwidth of the SRS. Optionally, the configuration information further includes an aperiodic SRS resource index number. In this way, aperiodic SRS transmission on the SCC pair may be triggered by using DCI for cross-carrier scheduling.

When the RRC reconfiguration signaling configures a UE-level PUCCH resource, configuration information includes at least one of a subcarrier spacing of a PUCCH, transmission bandwidth of the PUCCH, and an offset of the transmission bandwidth of the PUCCH. Optionally, the configuration information may further include a PUCCH resource index number.

Based on another advantage of a CC pair, the DCI for cross-carrier scheduling may be used for PDCCH order to trigger the UE to perform contention-free random access.

In addition, when the UE performs cell handover, when uplink resource selection decision is made in a target cell: A source cell notifies the target cell of an RSRP measurement result on a downlink carrier of a target CC pair over an X2/Xn interface; and the target CC pair notifies the source cell of information about the CC pair, common configuration information of the CC pair, UE-level configuration information, and UE-exclusive preamble information over the X2/Xn interface, and the source cell sends the configuration information to the UE by using the RRC connection reconfiguration signaling.

Optionally, an uplink reference point in the information about the CC pair sent by the target CC pair may be different from an uplink reference point in information about the CC pair sent by the source cell.

The common configuration information of the target CC pair includes NR radio Resource Config Common (including an uplink configuration part and a downlink configuration part) and SUL radio Resource Config Common (including SUL configuration information), and the UE-level configuration information includes an uplink BWP configuration part and a downlink BWP configuration part. The UE-exclusive preamble information includes information about ra-Preamble-Index and ra-PRACH-Mask-Index. The ra-Preamble-Index is used to indicate preamble information of the UE. The ra-PRACH-Mask-Index is used to indicate information used for sending a random access resource in a system frame. The UE-exclusive preamble information is included in a rach-ConfigDedicated/CFRA information element, the rach-ConfigDedicated/CFRA information element is included in a mobility Control Info information element, and the mobility Control Info information element is included in the RRC connection reconfiguration signaling.

A case in which uplink resource selection decision is made in the source cell is as follows: The source cell and the target cell exchange some configuration information of the target cell (one downlink reference point, at least two uplink reference points, and an uplink carrier selection RSRP threshold); and the source cell sends a handover request and an uplink resource decision result to the target cell over the X2/Xn interface based on the RSRP measurement result reported by the UE. The decision result may be represented by an absolute indication value of the uplink reference point.

The target cell sends the common configuration information of the target cell, the UE-level configuration information, and the UE-exclusive preamble information to the source cell over the X2/Xn interface, and the source cell sends the configuration information to the UE by using the RRC signaling.

The common configuration information of the target cell includes UL radio Resource Config Common (including an uplink configuration part and a downlink configuration part) and SUL radio Resource Config Common (including SUL configuration information), and the UE-level configuration information includes an uplink BWP configuration part and a downlink BWP configuration part. The uplink BWP configuration part includes the information about the uplink reference point. The UE-exclusive preamble information includes a ra-Preamble-Index and a ra-PRACH-Mask-Index. The ra-Preamble-Index is used to indicate the UE preamble information. The ra-PRACH-Mask-Index is used to indicate information used for sending a random access resource in a system frame. The UE-exclusive preamble information is included in a rach-ConfigDedicated/CFRA information element, the rach-ConfigDedicated/CFRA information element is included in a mobility Control Info information element, and the mobility Control Info information element is included in the RRC connection reconfiguration signaling.

Optionally, an uplink reference point in the information about the CC pair sent by the target CC pair may be different from an uplink reference point in information about the CC pair sent by the source cell. Exclusive preamble information specified by the target cell may be different from that specified by the source cell.

During a cell handover, the information about the target cell in the handover request is changed to the information about the target CC pair, and other parts can still be used.

In the data transmission method provided in this embodiment of this application, a cell of the network device may include two CC pairs. Based on information configuration of the CC pair, a CA mechanism may be basically used, and scheduling of DL and SUL shares one search space, thereby reducing a quantity of times of blind detection of the UE.

The RRC connection establishment message in this application may also be represented as RRC connection establishment signaling, an RRC connection re-establishment message may also be represented as RRC connection re-establishment signaling, an RRC connection reconfiguration message may also be represented as the RRC connection reconfiguration signaling.

Figure 7:
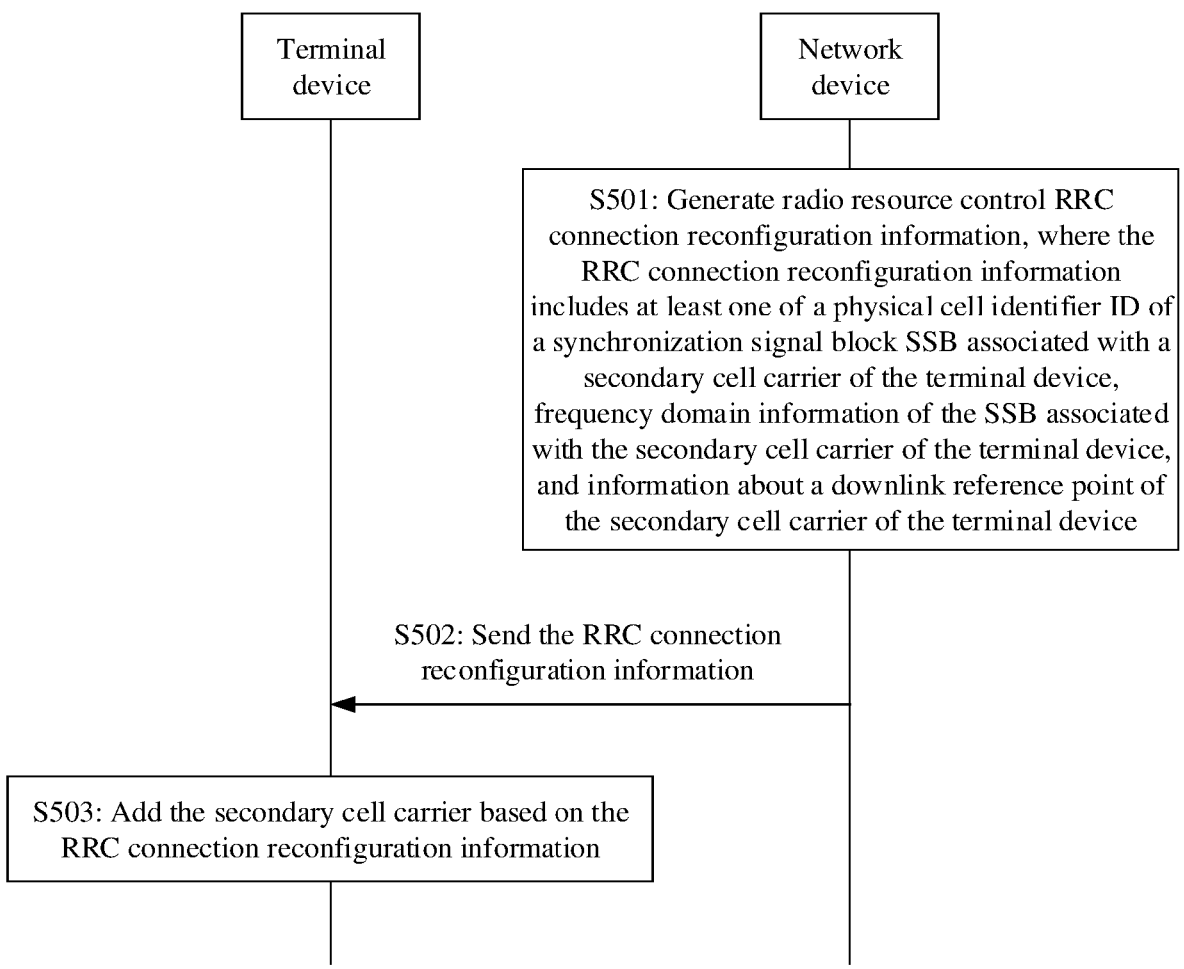
FIG. 7 is a schematic flowchart of a data transmission method according to another embodiment of this application.

An embodiment of this application further provides a data transmission method. As shown in FIG. 7, the method 500 includes the following steps.

S501: A network device generates radio resource control RRC connection reconfiguration information, where the RRC connection reconfiguration information includes at least one of a physical cell identifier ID of a synchronization signal block SSB associated with a secondary cell of a terminal device, frequency domain information of the SSB associated with the secondary cell of the terminal device, and information about a downlink reference point of the secondary cell of the terminal device.

S502: The network device sends the RRC connection reconfiguration information to the terminal device, and correspondingly, the terminal device receives the RRC connection reconfiguration information.

S503: The terminal device adds the secondary cell based on the RRC connection reconfiguration information.

In the data transmission method provided in this application, when the terminal device needs to access a new secondary cell after accessing a primary cell carrier, the network device may notify the terminal device, in the RRC connection reconfiguration information, of information related to the secondary cell. In this way, the terminal device may quickly and accurately access the secondary cell, thereby reducing a quantity of times of blind detection performed by the terminal device, and improving communication efficiency and user experience.

Optionally, the frequency domain information of the SSB associated with the secondary cell of the terminal device includes: at least one of a frequency domain position reference value of the SSB associated with the secondary cell of the terminal device, the SSB associated with the secondary cell of the terminal device, offset information of the downlink reference point of the secondary cell of the terminal device, and a number of a frequency band in which the SSB associated with the secondary cell of the terminal device is located.

Optionally, the SSB associated with the secondary cell of the terminal device is an SSB of the secondary cell of the terminal device.

Optionally, the RRC connection reconfiguration information further includes information about an uplink reference point, information about a downlink reference point, a physical cell ID, a synchronization signal block, and offset information of the downlink reference point that are of a secondary cell carrier pair of the terminal device, and the method 500 further includes: adding, by the terminal device, the secondary cell carrier pair based on the RRC connection reconfiguration information.

It should be understood that the implementations in the method 500 are similar to related descriptions in corresponding embodiments in the method 200. For a similar description, refer to related descriptions in the method 200. For brevity, details are not described herein again.

Figure 8:
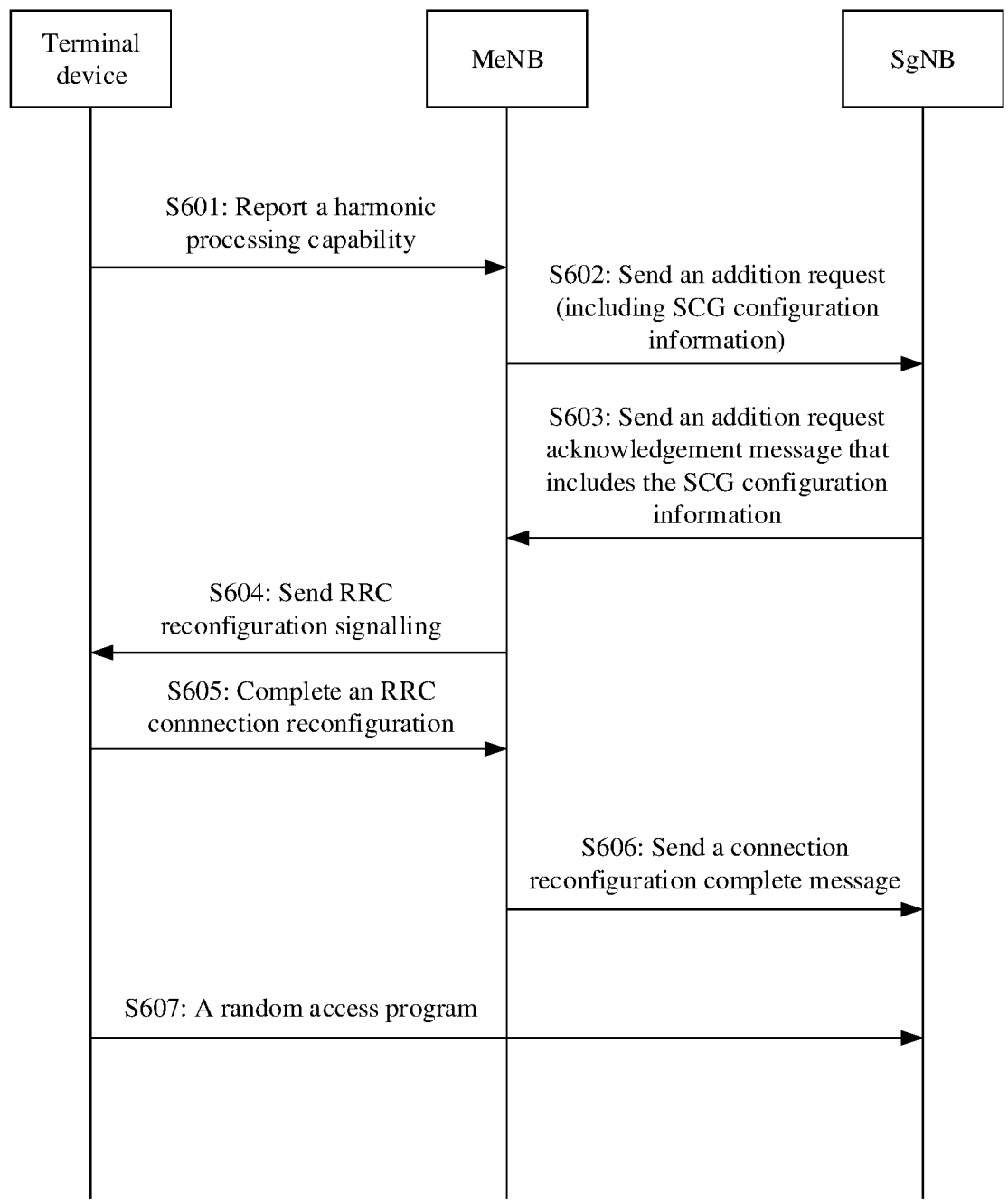
FIG. 8 is a schematic flowchart of a data transmission method according to another embodiment of this application.

An embodiment of this application further provides a data transmission method. As shown in FIG. 8, the method includes the following steps.

S601: UE reports a harmonic processing capability.

S602: An LTE master eNB (MeNB) or an NR master gNB (MeNB) sends request information for adding a secondary cell group (secondary cell group, SCG) to an NR secondary gNB (SgNB). The request information for adding the SCG includes at least one of a physical cell ID of a primary/secondary cell PSCell, a downlink reference point, a first offset between an SS block and the downlink reference point, a second offset between an SS block grid and a PRB grid, a UE-level downlink reference/uplink configuration (DL-reference DL/UL configuration), a UE-level subframe offset, and a UE harmonic processing capability.

Optionally, the downlink reference/uplink configuration (DL-reference DL/UL configuration) may be represented as TDD configurations 0 to 6, and a table of the DL-reference DL/UL configuration corresponding to the TDD configuration is predefined in a protocol, as shown in Table 4. A specific notification form is not limited thereto. Therefore, three bits are required to notify the UL/DL configurations 0 to 6.

TABLE 4

Table of a correspondence between an uplink/downlink configuration and a TDD configuration

| Uplink/downlink configuration | Frame number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 4-continued

Table of a correspondence between an uplink/downlink configuration and a TDD configuration

| Uplink/downlink configuration | Frame number | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Optionally, for the UL/DL configurations 3 to 6, the UE-level offset may range from 0 to 9. Therefore, four bits are required to identify (where there are 16 code points 0 to 15 in total) that an actual offset is mod (offset+subframe number, 10).

Optionally, three bits may also be used to identify a UE-level subframe offset (where there are eight code points 0 to 7 in total, 0 indicates no offset), and an actual offset is mod (offset+subframe number, 10). Therefore, for the configurations 3 to 6, the offset 8 or 9 cannot be completely identified. An actual quantity of required bits is related to an offset range to be identified.

Optionally, the UL/DL configurations and an offset of each configuration may also be jointly numbered. For the UL/DL configurations 0 to 2, an offset value thereof may range from 0 to 4. For the configurations 3 to 6, an offset value may be 0 to 9. In this way, it may be obtained that a total offset of the seven UL/DL configurations may be 15+40=55, and a total of 6 bits need to be used for indication (code point: from 0 to 63). 0 to 54 code points are respectively used to identify one subframe offset case of one UL/DL configuration.

Optionally, it may also be notified that a first subframe that is used to feed back a DL ACK/NACK and that is of each UL/DL configuration, for example, a first available uplink subframe of the UL/DL configuration 2, is 0, that is, representing the first row in the following table. If a first available uplink subframe is indicated to be 1, that is, representing the second row in the table, as shown in Table 5. The rest may be deduced by analogy, and details are not described again.

Optionally, the UL/DL configuration and the first uplink subframe may be jointly numbered for notification. A specific manner is similar to a manner in which the DL/UL configuration and the UE-level offset are jointly numbered, and details are not described herein again.

TABLE 5

Correspondence between an uplink/downlink configuration frame number and an uplink subframe

| First uplink frame | Uplink/downlink configuration frame number | | | | | | | | | |
|---|---|---|---|---|---|---|---|---|---|---|
| | 0 | 1 | 2 | 3 | 4 | 5 | 6 | 7 | 8 | 9 |
| 0 | 8, 7, 4, 6 | — | — | — | — | 8, 7, 4, 6 | — | — | — | — |
| 1 | — | 8, 7, 4, 6 | — | — | — | — | 8, 7, 4, 6 | — | — | — |
| 2 | — | — | 8, 7, 4, 6 | — | — | — | — | 8, 7, 4, 6 | — | — |
| 3 | — | — | — | 8, 7, 4, 6 | — | — | — | — | 8, 7, 4, 6 | — |
| 4 | — | — | — | — | 8, 7, 4, 6 | — | — | — | — | 8, 7, 4, 6 |

S603: The SgNB sends an addition request acknowledgement message of the SgNB to the MeNB, and transmits configuration information of the SCG to the MeNB. The configuration information of the SCG includes some NR DL and NR UL common resource configuration information. The common resource configuration information may be included in an NR radio Resource Config Common information element. For example, the information element includes at least one of initial access DL BWP configuration information, RACH configuration information, PUSCH common configuration information, PUCCH common configuration information, SRS common configuration information, common power control configuration information, uplink initial BWP configuration information, and an uplink carrier physical cell ID. When the NR UL common resource configuration information does not include the uplink carrier physical cell ID, a physical cell ID obtained by calculating an SS block on the downlink carrier is used as an ID of the uplink carrier physical cell.

Optionally, the configuration information of the SCG includes some SUL common resource configuration information. The common resource configuration information may be included in an SUL radio Resource Config Common information element. For example, the information element includes at least one of the RACH configuration information, uplink subcarrier offset information, uplink carrier selection threshold information, the PUSCH common configuration information, the PUCCH common configuration information, the SRS common configuration information, the common power control configuration information, the uplink initial BWP configuration information, and SUL physical cell ID information. When the NR SUL common resource configuration information does not include the uplink carrier physical cell ID, a physical cell ID obtained by calculating an SS block on the downlink carrier is used as an ID of the uplink carrier physical cell.

Optionally, information about an uplink reference point of the SUL may further be included in the SUL radio Resource Config Common information element.

The RACH configuration information, the uplink resource subcarrier offset information, the SUL physical cell ID information, the uplink carrier selection threshold information, and a BWP size included in the uplink initial BWP information and the like are similar to those included in the NR radio Resource Config Common information element.

Optionally, the configuration information of the SCG further includes at least one of the UE-level DL-reference DL/UL configuration and the UE-level subframe offset.

Optionally, when the harmonic processing capability of the UE interacting over an X2/Xn interface is weak, the SgNB adds one piece of indication information to a P/S Cell addition acknowledgment message, to instruct the UE to monitor a PDCCH based on a DL-reference slot before the UE receives RRC signaling sent by the SgNB by using the MeNB to transparently transmit a PDCCH monitoring (monitor) period. This reduces a quantity of times of blind detection of the UE.

Optionally, when the harmonic processing capability of the UE interacting over the X2/Xn interface is weak, the SgNB includes UE-level control resource set (CORESET) configuration information in the P/S Cell addition acknowledgment message. The UE-level control resource set configuration information includes a time domain, a frequency domain, a subcarrier spacing, and a monitoring period of the CORESET. The monitoring period is limited by the DL-reference slot.

Optionally, in S604, RRC reconfiguration signaling sent by the master station eNB to the UE includes the UE-level DL-reference DL/UL configuration and/or a UE-level TDD subframe offset.

Optionally, in S605, the MeNB sends the RRC reconfiguration signaling to a terminal device. The RRC reconfiguration signaling includes at least one of the DL-reference DL/UL configuration and the UE-level subframe offset.

Optionally, in S606, the UE sends RRC connection reconfiguration complete information to the MeNB.

In S607, the UE does not expect that a received time domain resource of an exclusive preamble resource indicated by the SgNB is in a UL-reference subframe of the UE-level DL-reference DL/UL configuration. If the exclusive preamble resource, indicated by the SgNB, received by the UE is in the UL-reference subframe of the UE-level DL-reference DL/UL configuration, the UE gives up sending an exclusive preamble.

PRACH and SRS configurations of the MeNB on an LTE UL carrier are not limited to the UE-level DL-reference DL/UL configuration (a UL subframe set). PRACH and SRS configurations of the SgNB on an NR SUL carrier or NR UL carrier are not limited to the UE-level DL-reference DL/UL configuration (a DL subframe set).

Optionally, a UE-level SRS time domain resource indicated by the SgNB also belongs to a UL-reference subframe set of the UE-level DL-reference DL/UL configuration, and the UE does not expect that the received SRS time domain resource indicated by the SgNB belongs to the UL-reference subframe of the DL/UL configuration.

Optionally, the UE does not expect that a received SRS time domain resource/PRACH time domain resource indicated by the MeNB belongs to the DL-reference subframe of the UE-level DL-reference DL/UL configuration.

In the data transmission method provided in this embodiment of this application, when a time division multiplexing pattern (TDM pattern) is notified, the UE does not expect to receive uplink transmission (PRACH, PUCCH, SRS, and PUSCH) of the UL-reference slot on the NR 3.5 G. A UE PDCCH monitor range is limited by a DL-reference slot set. When the UE TDM pattern is not notified, the base station does not schedule uplink transmission (PRACH, PUCCH, SRS, and PUSCH) in the UL-reference slot for the UE on the 3.5 G UL. This reduces 1.8 G uplink dual-transmission and 3.5 G uplink dual-transmission of a combination of some special bands (band), leads to a 1.8 G downlink receiving performance loss, or reduces harmonic impact of 1.8 G uplink transmission on 3.5 G downlink simultaneous receiving, and reduces unnecessary PDCCH blind detection of the UE in a UL subframe.

It should be understood that the foregoing description is intended to help a person skilled in the art better understand this embodiment of this application, but is not intended to limit the scope of this embodiment of this application. A person skilled in the art apparently can make various equivalent modifications or changes according to the examples described above, and such modifications or changes also fall within the scope of the embodiments of this application.

It should be understood that sequence numbers of the processes do not represent an execution sequence. The execution sequence of the processes should be determined based on the functions and internal logic of the processes. The sequence numbers should not constitute any limitation to the implementation processes of the embodiments of this application.

With reference to FIG. 1 to FIG. 8, the foregoing describes in detail the data transmission method according to the embodiments of this application. With reference to FIG. 9 to FIG. 16, the following describes in detail a communications apparatus according to the embodiments of this application.

Figure 9:
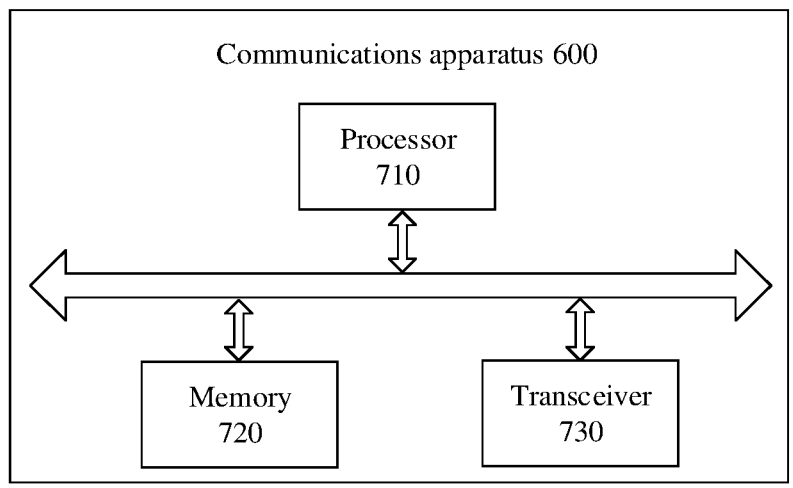
FIG. 9 is a schematic block diagram of a terminal device according to an embodiment of this application.

FIG. 9 is a schematic block diagram of a communications apparatus according to an embodiment of this application. It should be understood that, the communications apparatus embodiment corresponds to the method embodiment. For a similar description, refer to the method embodiment. The communications apparatus 700 shown in FIG. 9 may be configured to perform the steps that correspond to the method 200 and that are performed by the terminal device in FIG. 2 and FIG. 4. The communications apparatus 700 includes a processor 710, a memory 720, and a transceiver 730. The processor 710, the memory 720, and the transceiver 730 are connected through communication, the memory 720 stores an instruction, the processor 710 is configured to execute the instruction stored in the memory 720, and the transceiver 730 is configured to perform specific signal receiving and sending under driving of the processor 710.

The transceiver 730 is configured to receive uplink resource configuration information sent by a network device. The uplink resource configuration information includes information about at least two uplink reference points, and one uplink reference point corresponds to one uplink carrier.

The processor 710 is configured to determine, based on the uplink resource configuration information, an uplink carrier on which an uplink transmission resource is located.

According to the communications apparatus provided in this embodiment of this application, when there are a plurality of uplink carriers in a cell accessed by the communications apparatus, the network device sends information about reference points of the plurality of uplink carriers to the communications apparatus, and the communications apparatus may determine, based on the information about the plurality of reference points, a carrier, in the plurality of uplink carriers, on which the uplink transmission resource used by the communications apparatus is located, so that the communications apparatus may complete initial access or subsequent data transmission on the corresponding resource of the uplink carrier. In this way, the communication apparatus is saved from misunderstanding and conflicts during use of uplink resources on the plurality of uplink carriers, and transmission efficiency and quality are improved.

Components in the communications apparatus 700 are connected through communication, that is, the processor 710, the memory 720, and the transceiver 730 communicate with each other and transfer a control and/or data signal between each other by using an internal connection path. The foregoing method embodiments of this application may be applied to the processor, or the processor implements the steps of the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a central processing unit (CPU), a network processor (NP), a combination of a CPU and an NP, a digital signal processor (DSP), an application-specific integrated circuit (ASIC), or a field programmable gate array (FPGA) or another programmable logic device, a discrete gate or a transistor logic device, or a discrete hardware component. The processor may implement or perform the methods, the steps, and logical block diagrams that are disclosed in this application. The general purpose processor may be a microprocessor, or the processor may be any conventional processor or the like. Steps of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the transceiver 730 is specifically configured to receive a system information block SIB sent by the network device. The SIB includes the uplink resource configuration information. The uplink resource configuration information further includes information about at least two uplink initial bandwidth parts BWPs, and one uplink initial BWP corresponds to one uplink reference point. The processor 710 is specifically configured to determine, based on the SIB, an uplink initial BWP of the uplink carrier used for initial access.

Optionally, in another embodiment of this application, the transceiver 730 is specifically configured to: receive radio resource control RRC connection establishment information or RRC connection re-establishment information or RRC connection reconfiguration information sent by the network device. The RRC connection establishment information or the RRC connection re-establishment information or the RRC connection reconfiguration information includes the information about at least one of the uplink reference points. The processor 710 is further configured to determine, based on the RRC connection establishment information or the RRC connection re-establishment information or the RRC connection reconfiguration information, an uplink carrier resource used for uplink transmission.

Optionally, in another embodiment of this application, the RRC connection reconfiguration information further includes target cell configuration information. The target cell configuration information includes the uplink resource configuration information. The processor 710 is further configured to perform target cell handover based on the target cell configuration information.

Optionally, in another embodiment of this application, the RRC connection reconfiguration information further includes information about an uplink reference point, information about a downlink reference point, a physical cell ID, a synchronization signal block, and offset information of the downlink reference point that are of a secondary cell carrier pair of the terminal device. The processor 710 is further configured to add the secondary cell carrier pair based on the RRC connection reconfiguration information.

Optionally, in another embodiment of this application, the RRC connection reconfiguration information further includes at least one of a physical cell identifier ID of a synchronization signal block SSB associated with a secondary cell carrier of the terminal device, frequency domain information of the SSB associated with the secondary cell carrier of the terminal device, and information about a downlink reference point of the secondary cell carrier of the terminal device. The processor 710 is further configured to add the secondary cell carrier based on the RRC connection reconfiguration information.

Optionally, in another embodiment of this application, the RRC connection establishment information or the RRC connection re-establishment information further includes at least one of uplink BWP configuration information of the terminal device, physical uplink control channel PUCCH configuration information, and sounding reference signal SRS information of the terminal device.

Optionally, in another embodiment of this application, the information about the uplink reference point includes at least one of an absolute frequency position corresponding to the uplink reference point and a reference point index value corresponding to the uplink reference point.

Figure 10:
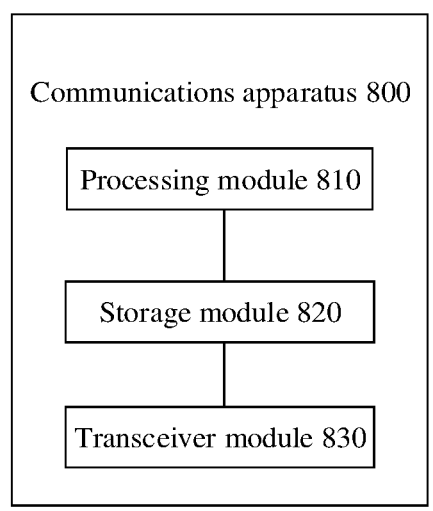
FIG. 10 is a schematic block diagram of a terminal device according to another embodiment of this application.

It should be noted that in this embodiment of this application, the processor 710 may be implemented by a processing module, the memory 720 may be implemented by a storage module, and the transceiver 730 may be implemented by a transceiver module. As shown in FIG. 10, a communications apparatus 800 may include a processing module 810, a storage module 820, and a transceiver module 830. Optionally, the communications apparatus 700 or the communications apparatus 800 may be the terminal device.

The communications apparatus 700 shown in FIG. 9 or the communications apparatus 800 shown in FIG. 10 can implement steps performed by the terminal device in the method 200, FIG. 2, FIG. 4, and FIG. 8. To avoid repetition, details are not described herein again.

Figure 11:
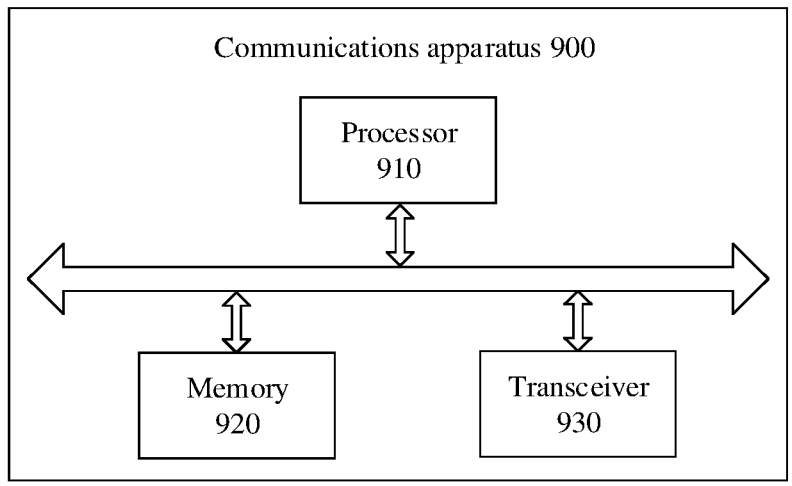
FIG. 11 is a schematic block diagram of a terminal device according to an embodiment of this application.

FIG. 11 is a schematic block diagram of a communications apparatus according to an embodiment of this application. It should be understood that, the communications apparatus embodiment corresponds to the method embodiment. For a similar description, refer to the method embodiment. The communications apparatus 900 shown in FIG. 11 may be configured to perform the steps that correspond to the method 200 and that are performed by the terminal device in FIG. 2 and FIG. 4. The communications apparatus 900 includes a processor 910, a memory 920, and a transceiver 930. The processor 910, the memory 920, and the transceiver 930 are connected through communication, the memory 920 stores an instruction, the processor 910 is configured to execute the instruction stored in the memory 920, and the transceiver 930 is configured to perform specific signal receiving and sending under driving of the processor 910.

The transceiver 930 is configured to receive radio resource control RRC connection reconfiguration information sent by a network device. The RRC connection reconfiguration information includes at least one of a physical cell identifier ID of a synchronization signal block SSB associated with a secondary cell carrier of the terminal device, frequency domain information of the SSB associated with the secondary cell carrier of the terminal device, and information about a downlink reference point of the secondary cell carrier of the terminal device.

The processor 910 is configured to add the secondary cell carrier based on the RRC connection reconfiguration information.

The communications apparatus provided in this embodiment of this application may enable, based on the RRC connection reconfiguration information sent by the network device, the communications apparatus to quickly and accurately access the secondary cell carrier, thereby reducing a quantity of times of blind detection performed by the terminal device, and improving communication efficiency and user experience.

Components in the communications apparatus 900 are connected through communication, that is, the processor 910, the memory 920, and the transceiver 930 communicate with each other and transfer a control and/or data signal between each other by using an internal connection path. The foregoing method embodiments of this application may be applied to the processor, or the processor implements the steps of the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a CPU, a network processor NP, or a combination of a CPU and an NP, a DSP, an ASIC, an FPGA or another programmable logic device, a discrete gate or a transistor logic device, or a discrete hardware component. The processor may implement or perform the methods, the steps, and logical block diagrams that are disclosed in this application. The general purpose processor may be a microprocessor, or the processor may be any conventional processor or the like. Steps of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the frequency domain information of the SSB associated with the secondary cell carrier of the terminal device includes at least one of a frequency domain position reference value of the SSB associated with the secondary cell carrier of the terminal device, the SSB associated with the secondary cell carrier of the terminal device, and offset information of the downlink reference point of the secondary cell carrier of the terminal device.

Optionally, in another embodiment of this application, the SSB associated with the secondary cell carrier of the terminal device is an SSB of the secondary cell carrier of the terminal device.

Optionally, in another embodiment of this application, the RRC connection reconfiguration information further includes information about an uplink reference point, information about a downlink reference point, a physical cell ID, a synchronization signal block, and offset information of the downlink reference point of a secondary cell carrier pair of the terminal device, and the processor 910 is further configured to add the secondary cell carrier pair based on the RRC connection reconfiguration information.

Figure 12:
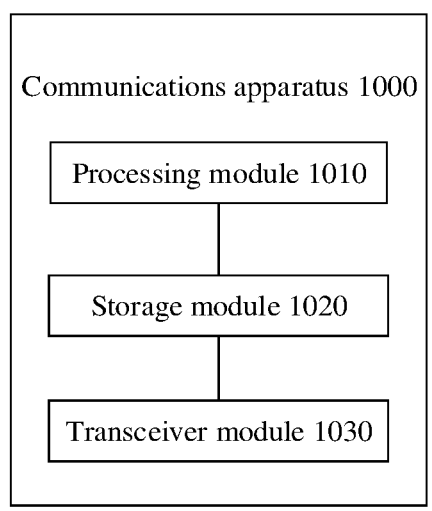
FIG. 12 is a schematic block diagram of a terminal device according to another embodiment of this application.

It should be noted that in this embodiment of this application, the processor 910 may be implemented by a processing module, the memory 920 may be implemented by a storage module, and the transceiver 930 may be implemented by a transceiver module. As shown in FIG. 12, a communications apparatus woo may include a processing module 1010, a storage module 1020, and a transceiver module 1030. Optionally, the communications apparatus 900 or the communications apparatus 1000 may be the terminal device.

The communications apparatus 900 shown in FIG. 11 or the communications apparatus 1000 shown in FIG. 12 can implement steps performed by the terminal device in the method 500 and FIG. 7. To avoid repetition, details are not described herein again.

Figure 13:
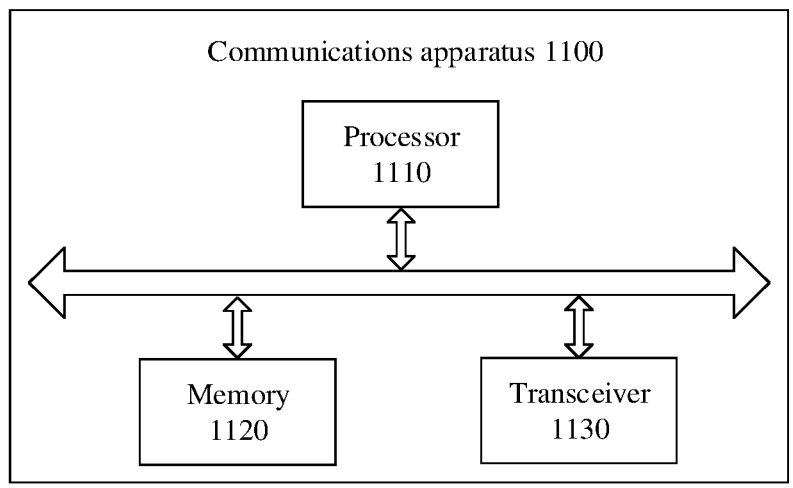
FIG. 13 is a schematic block diagram of a network device according to an embodiment of this application.

FIG. 13 is a schematic block diagram of a communications apparatus 1100 according to an embodiment of this application. It should be understood that, the communications apparatus embodiment corresponds to the method embodiment. For a similar description, refer to the method embodiment. The communications apparatus 1100 shown in FIG. 13 may be configured to perform the steps that correspond to the method 500 and that are performed by the network device in FIG. 7. As shown in FIG. 13, the communications apparatus 1100 includes a processor 1110, a memory 1120, and a transceiver 1130. The processor 1110, the memory 1120, and the transceiver 1130 are connected through communication, the memory 1120 stores an instruction, the processor 1110 is configured to execute the instruction stored in the memory 1120, and the transceiver 1130 is configured to perform specific signal receiving and sending under driving of the processor 1110.

The processor 1110 is configured to generate radio resource control RRC connection reconfiguration information. The RRC connection reconfiguration information includes at least one of a physical cell identifier ID of a synchronization signal block SSB associated with a secondary cell carrier of a terminal device, frequency domain information of the SSB associated with the secondary cell carrier of the terminal device, and information about a downlink reference point of the secondary cell carrier of the terminal device.

The transceiver 1130 is configured to send the RRC connection reconfiguration information to the terminal device. The RRC connection reconfiguration information is used by the terminal device to add the secondary cell carrier.

The communications apparatus provided in this embodiment of this application may notify the terminal device of the RRC connection reconfiguration information, and the RRC connection reconfiguration information includes at least one of the physical cell identifier ID of the synchronization signal block SSB associated with the secondary cell carrier of the terminal device, the frequency domain information of the SSB associated with the secondary cell carrier of the terminal device, and the information about the downlink reference point of the secondary cell carrier of the terminal device. In this way, the terminal device may quickly and accurately access the secondary cell carrier, thereby reducing a quantity of times of blind detection performed by the terminal device, and improving communication efficiency and user experience.

Components in the communications apparatus 1100 are connected through communication, that is, the processor 1110, the memory 1120, and the transceiver 1130 communicate with each other and transfer a control and/or data signal between each other by using an internal connection path. The foregoing method embodiments of this application may be applied to the processor, or the processor implements the steps of the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a CPU, a network processor NP, or a combination of a CPU and an NP, a DSP, an ASIC, an FPGA or another programmable logic device, a discrete gate or a transistor logic device, or a discrete hardware component. The processor may implement or perform the methods, the steps, and logical block diagrams that are disclosed in this application. The general purpose processor may be a microprocessor, or the processor may be any conventional processor or the like. Steps of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the frequency domain information of the SSB associated with the secondary cell carrier of the terminal device includes at least one of a frequency domain position reference value of the SSB associated with the secondary cell carrier of the terminal device, the SSB associated with the secondary cell carrier of the terminal device, and offset information of the downlink reference point of the secondary cell carrier of the terminal device.

Optionally, in another embodiment of this application, the SSB associated with the secondary cell carrier of the terminal device is an SSB of the secondary cell carrier of the terminal device.

Optionally, in another embodiment of this application, the RRC connection reconfiguration information further includes information about an uplink reference point, information about a downlink reference point, a physical cell ID, a synchronization signal block, and offset information of the downlink reference point of a secondary cell carrier pair of the terminal device, and the RRC connection reconfiguration information is used by the terminal device to add the secondary cell carrier pair.

Figure 14:
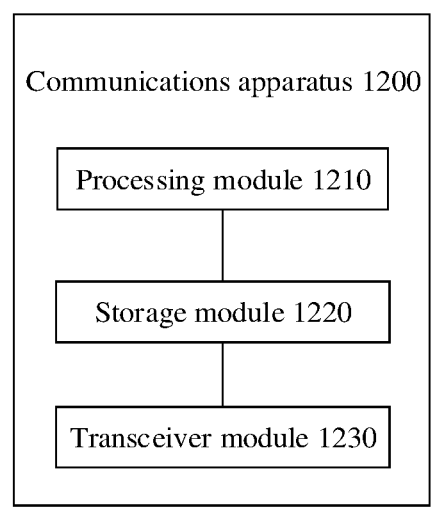
FIG. 14 is a schematic block diagram of a network device according to another embodiment of this application.

It should be noted that in this embodiment of the present invention, the processor 1110 may be implemented by a processing module, the memory 1120 may be implemented by a storage module, and the transceiver 1130 may be implemented by a transceiver module. As shown in FIG. 14, a communications apparatus 1200 may include a processing module 1210, a storage module 1220, and a transceiver module 1230. Optionally, the communications apparatus 1100 or the communications apparatus 1200 may be the network device.

The communications apparatus 1100 shown in FIG. 13 or the communications apparatus 1200 shown in FIG. 14 can implement steps performed by the network device in the method 500, FIG. 7, and FIG. 8. To avoid repetition, details are not described herein again.

Figure 15:
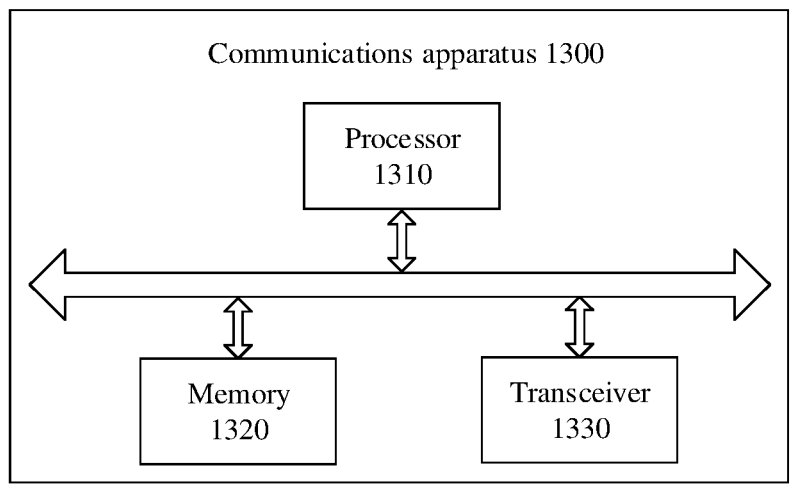
FIG. 15 is a schematic block diagram of a network device according to an embodiment of this application.

FIG. 15 is a schematic block diagram of a communications apparatus 1300 according to an embodiment of this application. It should be understood that, the communications apparatus embodiment corresponds to the method embodiment. For a similar description, refer to the method embodiment. The communications apparatus 1300 shown in FIG. 15 may be configured to perform the steps that correspond to the method 200 and that are performed by the network device in FIG. 2 and FIG. 4. As shown in FIG. 15, the communications apparatus 1300 includes a processor 1310, a memory 1320, and a transceiver 1330. The processor 1310, the memory 1320, and the transceiver 1330 are connected through communication, the memory 1320 stores an instruction, the processor 1310 is configured to execute the instruction stored in the memory 1320, and the transceiver 1330 is configured to perform specific signal receiving and sending under driving of the processor 1310.

The processor 1310 is configured to generate uplink resource configuration information. The uplink resource configuration information includes information about at least two uplink reference points, and one uplink reference point corresponds to one uplink carrier.

The transceiver 1330 is configured to send the uplink resource configuration information to a terminal device. The uplink resource configuration information is used by the terminal device to determine an uplink carrier on which an uplink transmission resource is located.

According to the communications apparatus provided in this embodiment of this application, when there are a plurality of uplink carriers in a cell accessed by the terminal device, the communications apparatus sends information about reference points of the plurality of uplink carriers to the terminal device, and the terminal device may determine, based on the information about the plurality of reference points, a carrier, in the plurality of uplink carriers, on which the uplink transmission resource used by the terminal device is located, so that the terminal device may complete initial access or subsequent data transmission on the corresponding resource of the uplink carrier. In this way, the terminal device is saved from misunderstanding and conflicts during use of uplink resources on the plurality of uplink carriers, and transmission efficiency and quality are improved.

Components in the communications apparatus 1300 are connected through communication, that is, the processor 1310, the memory 1320, and the transceiver 1330 communicate with each other and transfer a control and/or data signal between each other by using an internal connection path. The foregoing method embodiments of this application may be applied to the processor, or the processor implements the steps of the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a CPU, a network processor NP, or a combination of a CPU and an NP, a DSP, an ASIC, an FPGA or another programmable logic device, a discrete gate or a transistor logic device, or a discrete hardware component. The processor may implement or perform the methods, the steps, and logical block diagrams that are disclosed in this application. The general purpose processor may be a microprocessor, or the processor may be any conventional processor or the like. Steps of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the processor 1310 is specifically configured to generate a system information block SIB. The SIB includes the uplink resource configuration information, the uplink resource configuration information further includes information about at least two uplink initial bandwidth parts BWPs, and one uplink initial BWP corresponds to one uplink reference point. The transceiver 1330 is specifically configured to send the SIB to the terminal device.

Optionally, in another embodiment of this application, the processor 1310 is further configured to generate radio resource control RRC connection establishment information or RRC connection re-establishment information or RRC connection reconfiguration information. The RRC connection establishment information or the RRC connection re-establishment information or the RRC connection reconfiguration information includes the information about at least one of the uplink reference points. The transceiver 1330 is further configured to send the RRC connection establishment information or the RRC connection re-establishment information or the RRC connection reconfiguration information to the terminal device.

Optionally, in another embodiment of this application, the RRC connection reconfiguration information further includes target cell configuration information. The target cell configuration information includes the uplink resource configuration information, and the target cell configuration information is used by the terminal device to perform target cell handover.

Optionally, in another embodiment of this application, the RRC connection reconfiguration information further includes information about an uplink reference point, information about a downlink reference point, a physical cell ID, a synchronization signal block, and offset information of the downlink reference point of a secondary cell carrier pair of the terminal device, and the RRC connection reconfiguration information is used by the terminal device to add the secondary cell carrier pair.

Optionally, in another embodiment of this application, the RRC connection reconfiguration information further includes at least one of a physical cell identifier ID of a synchronization signal block SSB associated with a secondary cell carrier of the terminal device, frequency domain information of the SSB associated with the secondary cell carrier of the terminal device, and information about a downlink reference point of the secondary cell carrier of the terminal device, and the RRC connection reconfiguration information is used by the terminal device to add the secondary cell carrier.

Optionally, in another embodiment of this application, the RRC connection establishment information or the RRC connection re-establishment information further includes at least one of uplink BWP configuration information of the terminal device, physical uplink control channel PUCCH configuration information, and sounding reference signal SRS information of the terminal device.

Optionally, in another embodiment of this application, the information about the uplink reference point includes at least one of an absolute frequency position corresponding to the uplink reference point and a reference point index value corresponding to the uplink reference point.

Figure 16:
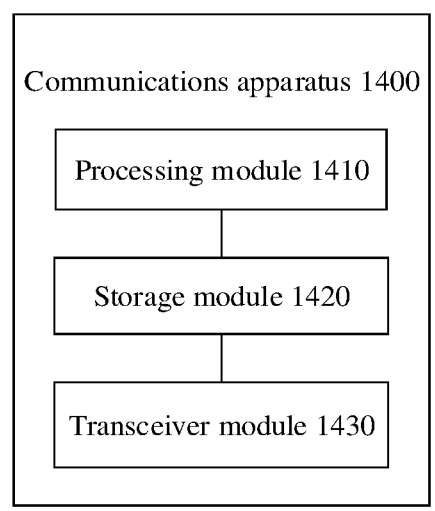
FIG. 16 is a schematic block diagram of a network device according to another embodiment of this application.

It should be noted that in this embodiment of the present invention, the processor 1310 may be implemented by a processing module, the memory 1320 may be implemented by a storage module, and the transceiver 1330 may be implemented by a transceiver module. As shown in FIG. 16, a communications apparatus 1400 may include a processing module 1410, a storage module 1420, and a transceiver module 1430. Optionally, the communications apparatus 1300 or the communications apparatus 1400 may be the network device.

The communications apparatus 1300 shown in FIG. 15 or the communications apparatus 1400 shown in FIG. 16 can implement steps performed by the network device in the method 200. To avoid repetition, details are not described herein again.

An embodiment of this application further provides a computer-readable medium. The computer-readable medium is configured to store computer program code, and the computer program includes instructions used for performing the data transmission method according to the embodiments of this application in FIG. 2, FIG. 4, FIG. 7, and FIG. 8. The readable medium may be a read-only memory (ROM) or a random access memory (RAM). This is not limited in this embodiment of this application.

An embodiment of this application further provides a communications system. The communications system includes the communications apparatus provided in the foregoing embodiments of this application, and the communications system can implement any data transmission method provided in the embodiments of this application.

An embodiment of this application further provides a system chip. The system chip includes a processing unit and a communications unit. The processing unit may be, for example, a processor, and the communications unit may be, for example, an input/output interface, a pin, or a circuit. The processing unit may execute a computer instruction to enable a chip in the terminal to perform the direct-link data transmission method in any implementation of the first aspect.

Optionally, the computer instruction is stored in a storage unit.

Optionally, the storage unit may be a storage unit inside the chip, such as a register or a cache. Alternatively, the storage unit may be a storage unit that is inside the terminal and that is located outside the chip, such as a ROM, another type of static storage device that can store static information and instructions, or a RAM. Any processor mentioned above may be a CPU, a microprocessor, an ASIC, or one or more integrated circuits executed by a program used to control the foregoing first direct-link data transmission method.

An embodiment of this application further provides a communications apparatus, including a processor (or referred to as a processing circuit), configured to: be coupled to a memory, and read and execute an instruction in the memory, to implement the method on a terminal device side or a network device side in any one of the foregoing embodiments. Optionally, the communications apparatus further includes the memory. Optionally, the communications apparatus may be a chip, a chip system, an integrated circuit, or the like. Optionally, the communications apparatus may be integrated into a terminal device or a network device.

An embodiment of this application further provides a computer program product. The product includes an instruction used to perform the method on a terminal device side or a network device side in any one of the foregoing embodiments.

It should be understood that, the foregoing descriptions of the embodiments of this application focus on differences between the embodiments. For same or similar parts that are not mentioned, refer to the embodiments. For brevity, details are not described herein again.

It should be further understood that the term "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving uplink resource configuration information sent by a network device, wherein the uplink resource configuration information comprises information about at least two uplink reference points, wherein, for each uplink reference point of the at least two uplink reference points, the respective uplink reference point corresponds to one respective uplink carrier, wherein each uplink reference point of the at least two uplink reference points is for the same cell and is for a different uplink carrier, wherein at least a first uplink reference point of the at least two uplink reference points is a new radio uplink carrier reference point for a cell, wherein at least a second uplink reference point of the at least two uplink reference points is a new radio supplemental uplink carrier reference point for the cell, and wherein the new radio supplemental uplink carrier reference point is a reference point for a new radio supplemental uplink carrier that is a Long Term Evolution Frequency Division Duplexing (LTD FDD) uplink carrier that is shared for new radio (NR) uplink transmission; and
    determining, based on the uplink resource configuration information, an uplink carrier on which an uplink transmission resource is located.

2. The method according to claim 1, wherein receiving the uplink resource configuration information sent by the network device comprises:
    receiving a system information block (SIB) sent by the network device, wherein the SIB comprises the uplink resource configuration information, the uplink resource configuration information further comprises information about at least two uplink initial bandwidth parts (BWPs), and wherein, for each uplink initial bandwidth part of the at least two uplink initial bandwidth parts, the respective uplink initial BWP corresponds to one respective uplink reference point; and
    determining, based on the uplink resource configuration information, the uplink carrier on which the uplink transmission resource is located comprises:
        determining, based on the SIB, an uplink initial BWP of an uplink carrier used for initial access.

3. The method according to claim 1, further comprising:
    receiving radio resource control (RRC) information sent by the network device, wherein the RRC information comprises information about at least one uplink reference point of the at least two uplink reference points, and the RRC information is RRC connection establishment information or RRC connection reestablishment information or RRC connection reconfiguration information; and
    determining, based on the RRC information, an uplink carrier resource used for uplink transmission.

4. The method according to claim 3, wherein the RRC connection reconfiguration information comprises target cell configuration information, the target cell configuration information comprises the uplink resource configuration information, and the method further comprises:
    performing target cell handover based on the target cell configuration information.

5. The method according to claim 3, wherein:
    the RRC connection reconfiguration information comprises:
        a physical cell identifier (ID) of a synchronization signal block (SSB) associated with a secondary cell carrier of a terminal device;
        frequency domain information of the SSB associated with the secondary cell carrier of the terminal device; or
        information about a downlink reference point of the secondary cell carrier of the terminal device; and
    the method further comprises:
        adding the secondary cell carrier based on the RRC connection reconfiguration information.

6. A method, comprising:
    generating uplink resource configuration information, wherein the uplink resource configuration information comprises information about at least two uplink reference points, wherein, for each uplink reference point of the at least two uplink reference points, the respective uplink reference point corresponds to one respective uplink carrier, wherein each uplink reference point of the at least two uplink reference points is for the same cell and is for a different uplink carrier, wherein at least a first uplink reference point of the at least two uplink reference points is a new radio uplink carrier reference point for a cell, wherein at least a second uplink reference point of the at least two uplink reference points is a new radio supplemental uplink carrier reference point for the cell, and wherein the new radio supplemental uplink carrier reference point is a reference point for a new radio supplemental uplink carrier that is a Long Term Evolution Frequency Division Duplexing (LTD FDD) uplink carrier that is shared for new radio (NR) uplink transmission; and sending the uplink resource configuration information to a terminal device, wherein the uplink resource configuration information indicates an uplink carrier on which an uplink transmission resource is located.

7. The method according to claim 6, wherein:
generating the uplink resource configuration information comprises:
  generating a system information block (SIB), wherein the SIB comprises the uplink resource configuration information, the uplink resource configuration information further comprises information about at least two uplink initial bandwidth parts (BWPs), and wherein, for each uplink initial bandwidth part of the at least two uplink initial bandwidth parts, the respective uplink initial BWP corresponds to one respective uplink reference point; and
sending the uplink resource configuration information to the terminal device comprises:
  sending the SIB to the terminal device.

8. The method according to claim 6, further comprising:
generating radio resource control (RRC) information, wherein the RRC information comprises information about at least one of the uplink reference points of the at least two uplink references points, and the RRC information comprises RRC connection establishment information or RRC connection re-establishment information or RRC connection reconfiguration information; and
sending the RRC information to the terminal device.

9. The method according to claim 8, wherein the RRC connection reconfiguration information comprises target cell configuration information, the target cell configuration information comprises the uplink resource configuration information, and the target cell configuration information is usable by the terminal device to perform target cell handover.

10. The method according to claim 8, wherein:
the RRC connection reconfiguration information comprises:
  a physical cell identifier (ID) of a synchronization signal block (SSB) associated with a secondary cell carrier of the terminal device;
  frequency domain information of the SSB associated with the secondary cell carrier of the terminal device; or
  information about a downlink reference point of the secondary cell carrier of the terminal device; and
the RRC connection reconfiguration information is usable by the terminal device to add the secondary cell carrier.

11. A terminal apparatus, comprising:
a processor; and
a non-transitory computer readable storage medium storing programming for execution by the processor, the programming including instructions to:
  receive uplink resource configuration information from a network device, wherein the uplink resource configuration information comprises information about at least two uplink reference points, wherein, for each uplink reference point of the at least two uplink reference points, the respective uplink reference point corresponds to one respective uplink carrier, wherein each uplink reference point of the at least two uplink reference points is for the same cell and is for a different uplink carrier, wherein at least a first uplink reference point of the at least two uplink reference points is a new radio uplink carrier reference point for a cell, wherein at least a second uplink reference point of the at least two uplink reference points is a new radio supplemental uplink carrier reference point for the cell, and wherein the new radio supplemental uplink carrier reference point is a reference point for a new radio supplemental uplink carrier that is a Long Term Evolution Frequency Division Duplexing (LTD FDD) uplink carrier that is shared for new radio (NR) uplink transmission; and
  determine, based on the uplink resource configuration information, an uplink carrier on which an uplink transmission resource is located.

12. The terminal apparatus according to claim 11, wherein the programming includes instructions to:
  receive a system information block (SIB) from the network device, wherein the SIB comprises the uplink resource configuration information, the uplink resource configuration information further comprises information about at least two uplink initial bandwidth parts (BWPs), and wherein, for each uplink initial bandwidth part of the at least two uplink initial bandwidth parts, the respective uplink initial BWP corresponds to one respective uplink reference point; and
  determine, based on the SIB, an uplink initial BWP of the uplink carrier used for initial access.

13. The terminal apparatus according to claim 11, wherein the programming further includes instructions to:
  receive radio resource control (RRC) information from the network device, wherein the RRC information comprises information about at least uplink reference point of the at least two uplink reference points, and the RRC information comprises RRC connection establishment information or RRC connection reestablishment information or RRC connection reconfiguration information; and
  determine, based on the RRC information, an uplink carrier resource used for uplink transmission.

14. The terminal apparatus according to claim 13, wherein the RRC connection reconfiguration information comprises target cell configuration information, the target cell configuration information comprises the uplink resource configuration information, and the programming further includes instructions to:
  perform a target cell handover based on the target cell configuration information.

15. The terminal apparatus according to claim 13, wherein:
the RRC connection reconfiguration information further comprises:
  a physical cell identifier (ID) of a synchronization signal block (SSB) associated with a secondary cell carrier of a terminal device;
  frequency domain information of the SSB associated with the secondary cell carrier of the terminal device; or
  information about a downlink reference point of the secondary cell carrier of the terminal device; and
the programming further includes instructions to:
  add the secondary cell carrier based on the RRC connection reconfiguration information.

16. A network device, comprising:
a processor; and
a non-transitory computer readable storage medium storing programming for execution by the processor, the programming including instructions to:
  generate uplink resource configuration information, wherein the uplink resource configuration information comprises information about at least two uplink reference points, wherein, for each uplink reference point of the at least two uplink reference points, the respective uplink reference point corresponds to one respective uplink carrier, wherein each uplink reference point of the at least two uplink reference points is for the same cell and is for a different uplink carrier, wherein at least a first uplink reference point of the at least two uplink reference points is a new radio uplink carrier reference point for a cell, wherein at least a second uplink reference point of the at least two uplink reference points is a new radio supplemental uplink carrier reference point for the cell, and wherein the new radio supplemental uplink carrier reference point is a reference point for a new radio supplemental uplink carrier that is a Long Term Evolution Frequency Division Duplexing (LTD FDD) uplink carrier that is shared for new radio (NR) uplink transmission; and send the uplink resource configuration information to a terminal device, wherein the uplink resource configuration information indicates an uplink carrier on which an uplink transmission resource is located.

17. The network device according to claim 16, wherein the programming includes instructions to:

generate a system information block (SIB), wherein the SIB comprises the uplink resource configuration information, the uplink resource configuration information further comprises information about at least two uplink initial bandwidth parts (BWPs), and wherein, for each uplink initial BWP of the at least two uplink initial BWPs, the respective uplink initial BWP corresponds to one respective uplink reference point; and send the SIB to the terminal device.

18. The network device according to claim 16, wherein the programming further includes instructions to:

generate radio resource control (RRC) information, wherein the RRC information comprises information about at least one uplink reference point of the at least two uplink reference points, and wherein the RRC information comprises RRC connection establishment information or RRC connection re-establishment information or RRC connection reconfiguration information; and send the RRC information to the terminal device.

19. The network device according to claim 18, wherein the RRC connection reconfiguration information comprises target cell configuration information, the target cell configuration information comprises the uplink resource configuration information, and the target cell configuration information is usable by the terminal device to perform target cell handover.

20. The network device according to claim 18, wherein:

the RRC connection reconfiguration information comprises:

a physical cell identifier (ID) of a synchronization signal block (SSB) associated with a secondary cell carrier of the terminal device;

frequency domain information of the SSB associated with the secondary cell carrier of the terminal device; or information about a downlink reference point of the secondary cell carrier of the terminal device; and the RRC connection reconfiguration information is usable by the terminal device to add the secondary cell carrier.

* * * * *